(12) United States Patent
Fukunaga et al.

(10) Patent No.: US 10,075,614 B2
(45) Date of Patent: Sep. 11, 2018

(54) IMAGE PROCESSING APPARATUS AND NON-TRANSITORY COMPUTER READABLE MEDIUM

(71) Applicant: FUJI XEROX CO., LTD., Tokyo (JP)

(72) Inventors: Masakazu Fukunaga, Kanagawa (JP); Minoru Sodeura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/583,287

(22) Filed: May 1, 2017

(65) Prior Publication Data

US 2018/0152594 A1 May 31, 2018

(30) Foreign Application Priority Data

Nov. 30, 2016 (JP) .................. 2016-232398

(51) Int. Cl.
*H04N 1/04* (2006.01)
*H04N 1/387* (2006.01)
*H04N 1/00* (2006.01)

(52) U.S. Cl.
CPC ....... *H04N 1/3878* (2013.01); *H04N 1/00037* (2013.01); *H04N 1/00092* (2013.01); *H04N 2201/0094* (2013.01)

(58) Field of Classification Search
CPC .......... B65H 2801/39; G06F 17/30247; G06F 3/04845; G06F 3/0488; G06F 1/169; G06F 2203/0339; G06F 3/017; G06F 3/0224; G06F 3/0304; G06F 3/0317; G06F 3/03547; G06F 3/0426; G06K 9/00013; G06K 9/00442

USPC ....... 382/284, 294, 218, 282, 190, 199, 266, 382/287, 289, 306, 321; 348/36, 222.1, 348/246, 335, 46, E5.031, E5.079, 348/E7.085, 148, 164, 208.4, 240.3, 247, 348/345, 360, 39; 358/450, 474, 1.12, 358/453, 540

See application file for complete search history.

(56) References Cited

U.S. PATENT DOCUMENTS

| | | | | |
|---|---|---|---|---|
| 6,111,667 | A * | 8/2000 | Mishima | G06K 9/32 358/401 |
| 6,332,574 | B1 * | 12/2001 | Shigekusa | G06K 7/10722 235/462.09 |
| 6,549,681 | B1 * | 4/2003 | Takiguchi | G06T 3/4038 358/450 |
| 9,892,336 | B2 * | 2/2018 | Chen | G06K 9/3233 |
| 2003/0103159 | A1 * | 6/2003 | Nonaka | H04N 5/217 348/371 |
| 2009/0161172 | A1 * | 6/2009 | Mizutani | G06T 5/40 358/466 |

(Continued)

FOREIGN PATENT DOCUMENTS

| | | |
|---|---|---|
| JP | 2958981 B2 | 10/1999 |
| JP | 2003-338920 A | 11/2003 |
| JP | 4795038 B2 | 10/2011 |

*Primary Examiner* — Negussie Worku
(74) *Attorney, Agent, or Firm* — Sughrue Mion, PLLC

(57) ABSTRACT

An image processing apparatus includes a first detection unit and a second detection unit. The first detection unit detects a rectangular shape in an image including plural document images. The second detection unit detects, in a case where a background of the rectangular shape is not white, rectangular shapes included in the rectangular shape detected by the first detection unit as document images.

14 Claims, 26 Drawing Sheets

(56) References Cited

U.S. PATENT DOCUMENTS

| | | | |
|---|---|---|---|
| 2009/0185240 A1* | 7/2009 | Kato | H04N 1/00681 |
| | | | 358/474 |
| 2009/0257658 A1* | 10/2009 | Fukunaga | H04N 1/3873 |
| | | | 382/199 |
| 2010/0026835 A1* | 2/2010 | Negishi | H04N 3/1562 |
| | | | 348/223.1 |
| 2010/0238516 A1* | 9/2010 | Ito | H04N 1/387 |
| | | | 358/448 |
| 2011/0187815 A1* | 8/2011 | Asami | H04N 5/228 |
| | | | 348/36 |
| 2013/0101301 A1* | 4/2013 | Takikawa | G03G 15/5058 |
| | | | 399/10 |
| 2016/0100145 A1* | 4/2016 | Gunji | H04N 5/23293 |
| | | | 348/222.1 |
| 2017/0353710 A1* | 12/2017 | Sasaki | H04N 7/181 |
| 2018/0025305 A1* | 1/2018 | Rutherford | G06Q 10/06314 |
| 2018/0061363 A1* | 3/2018 | Lee | G06F 3/147 |

* cited by examiner

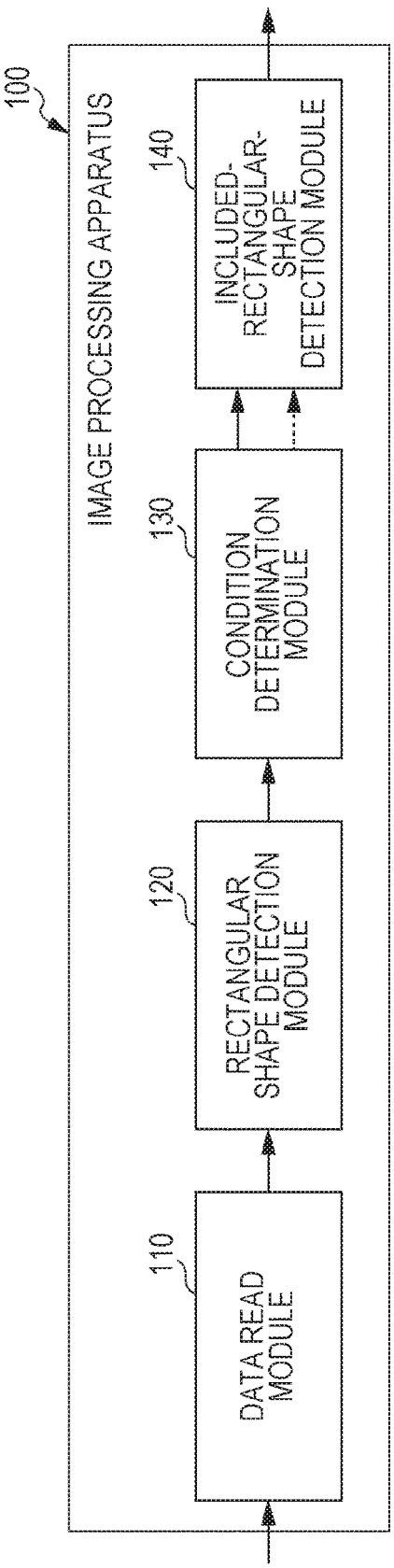

FIG. 3A
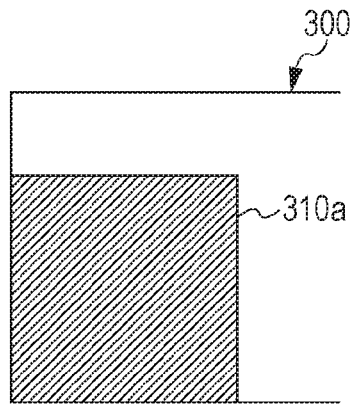
FIG. 3B1
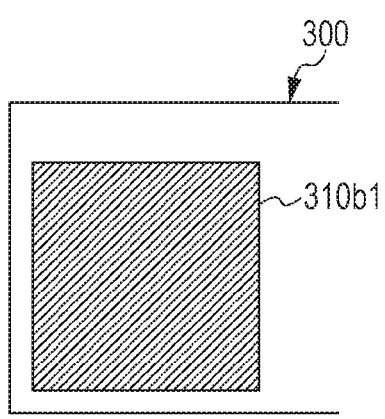
FIG. 3B2
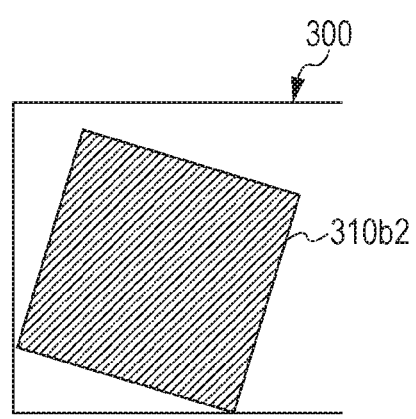
FIG. 3C
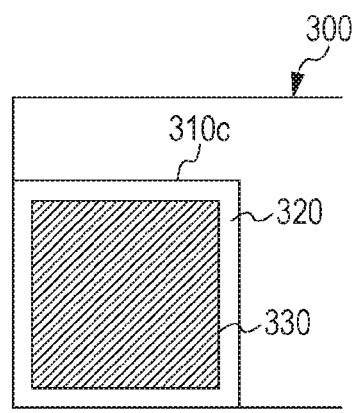

FIG. 4A1
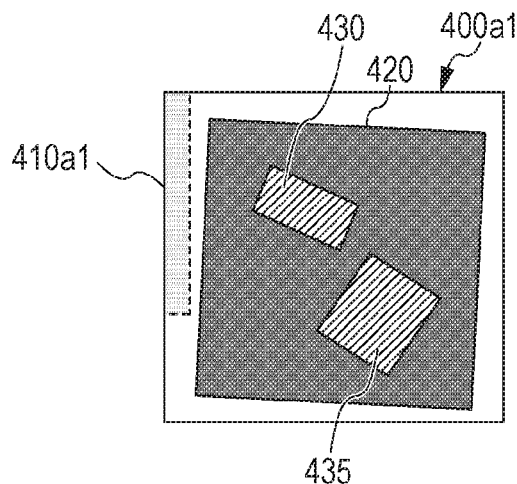
FIG. 4A2
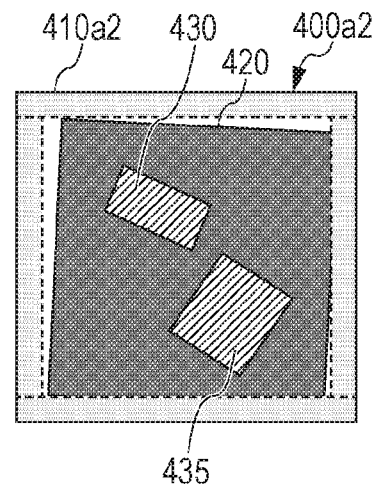
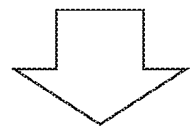
FIG. 4B
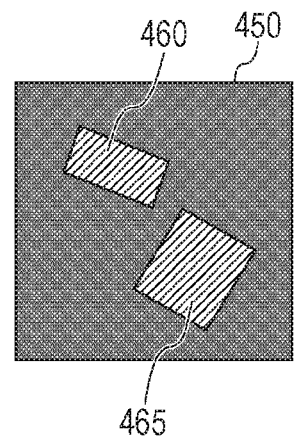

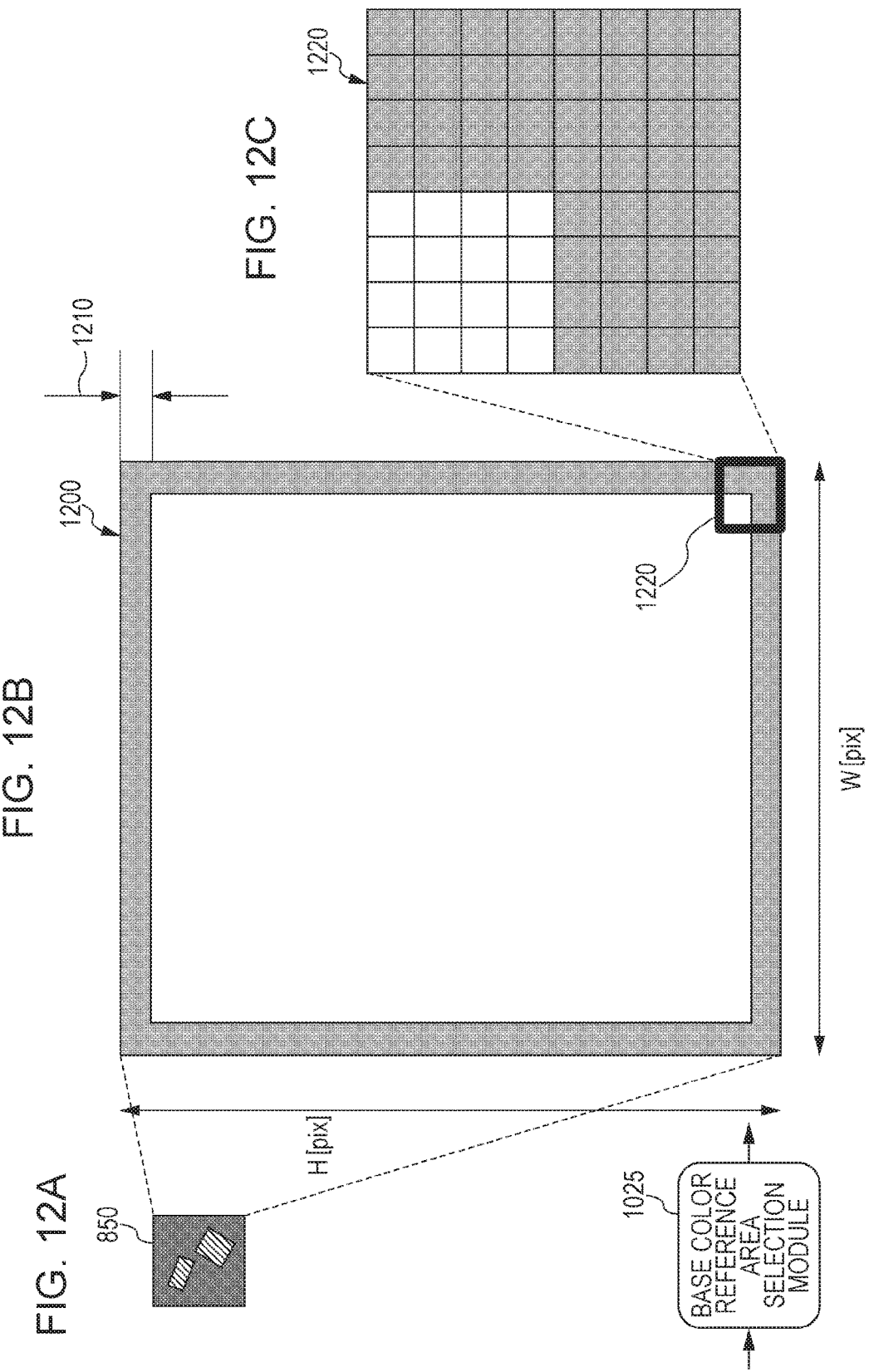

FIG. 14

| IMAGE ID | NUMBER OF DOCUMENT IMAGES | DOCUMENT IMAGE ID | VERTEX A | VERTEX B | VERTEX C | VERTEX D | ... |
|---|---|---|---|---|---|---|---|
| 1405 | 1410 | 1415 | 1420 | 1425 | 1430 | 1435 | |

1400

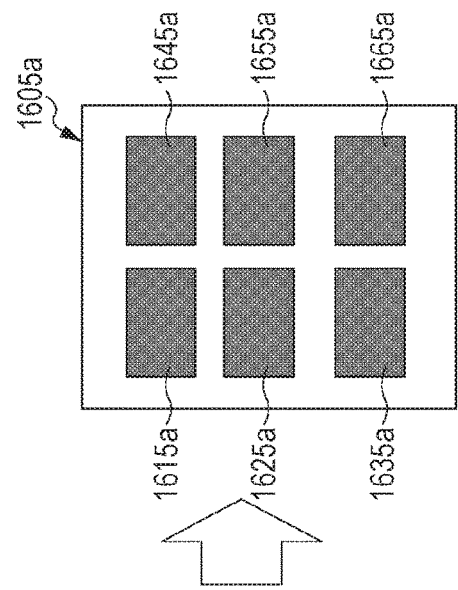
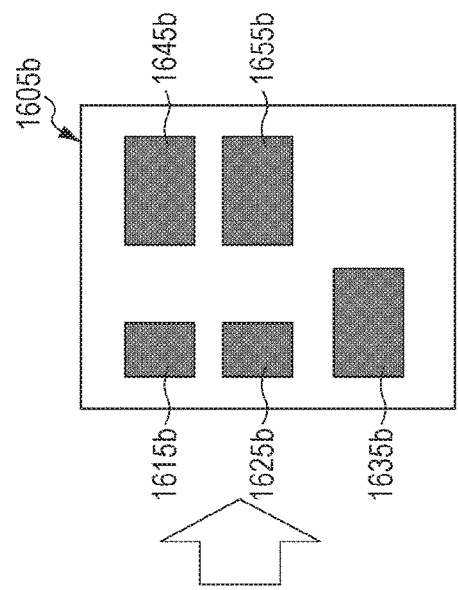
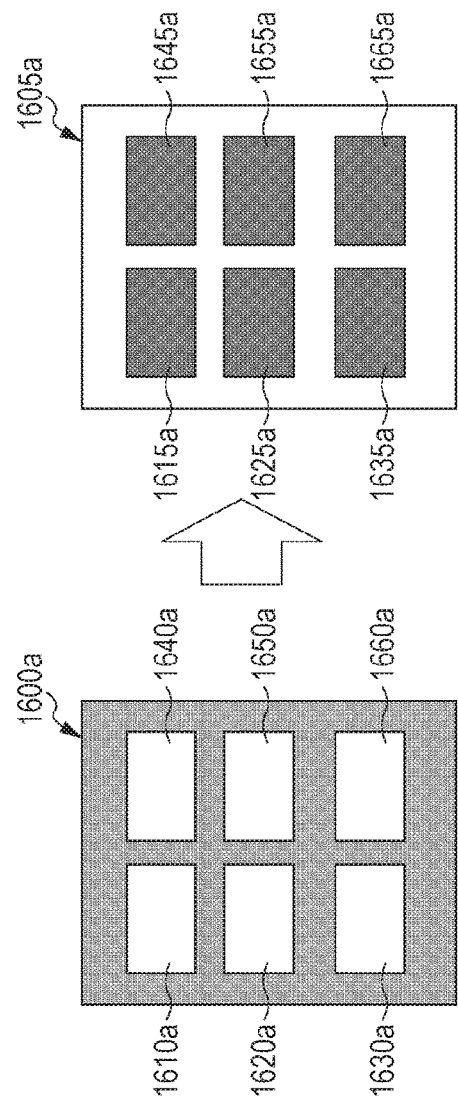
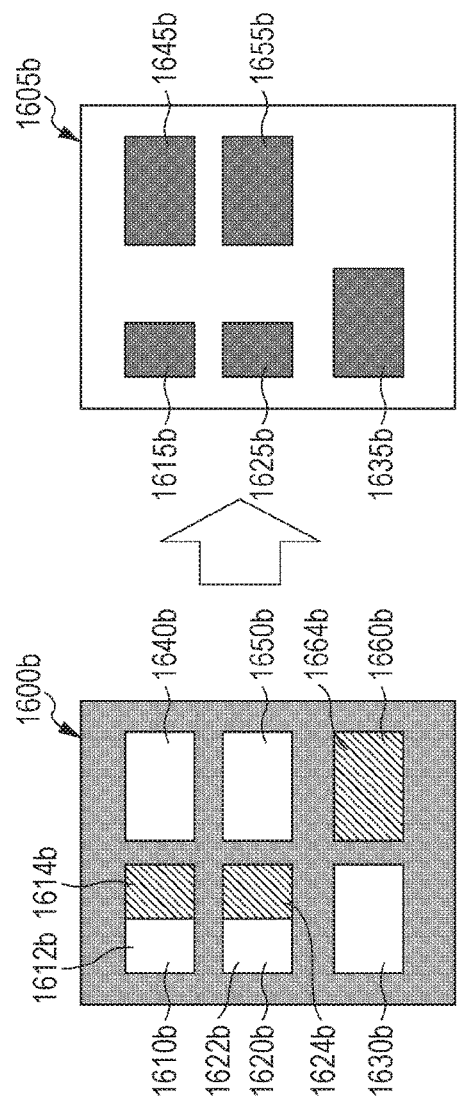

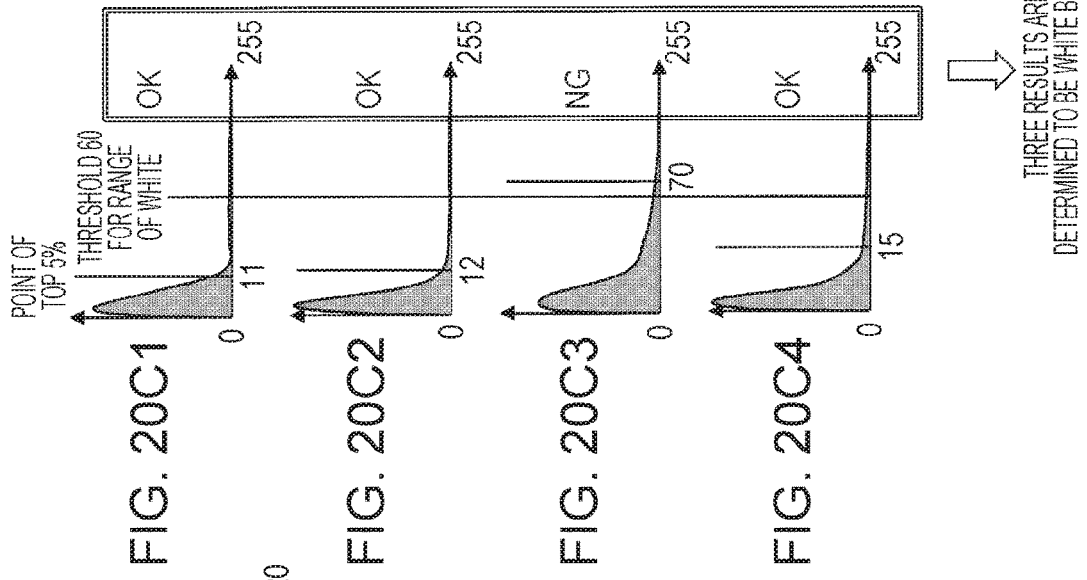
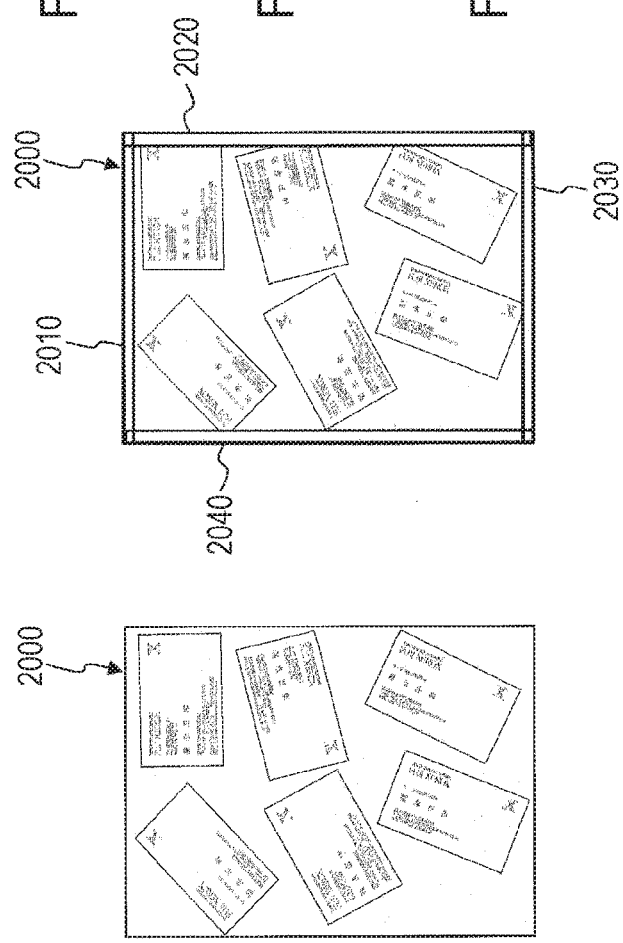

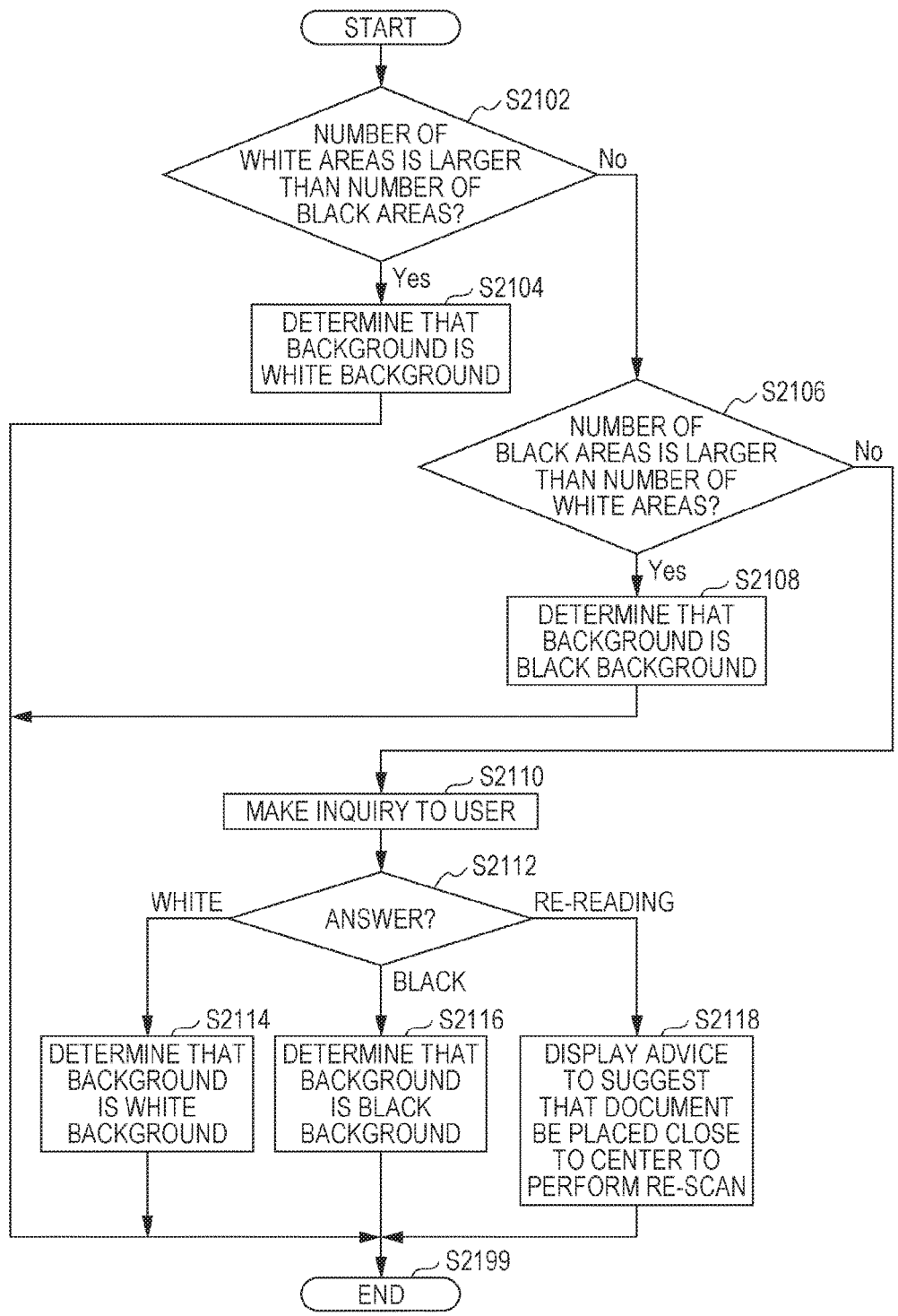

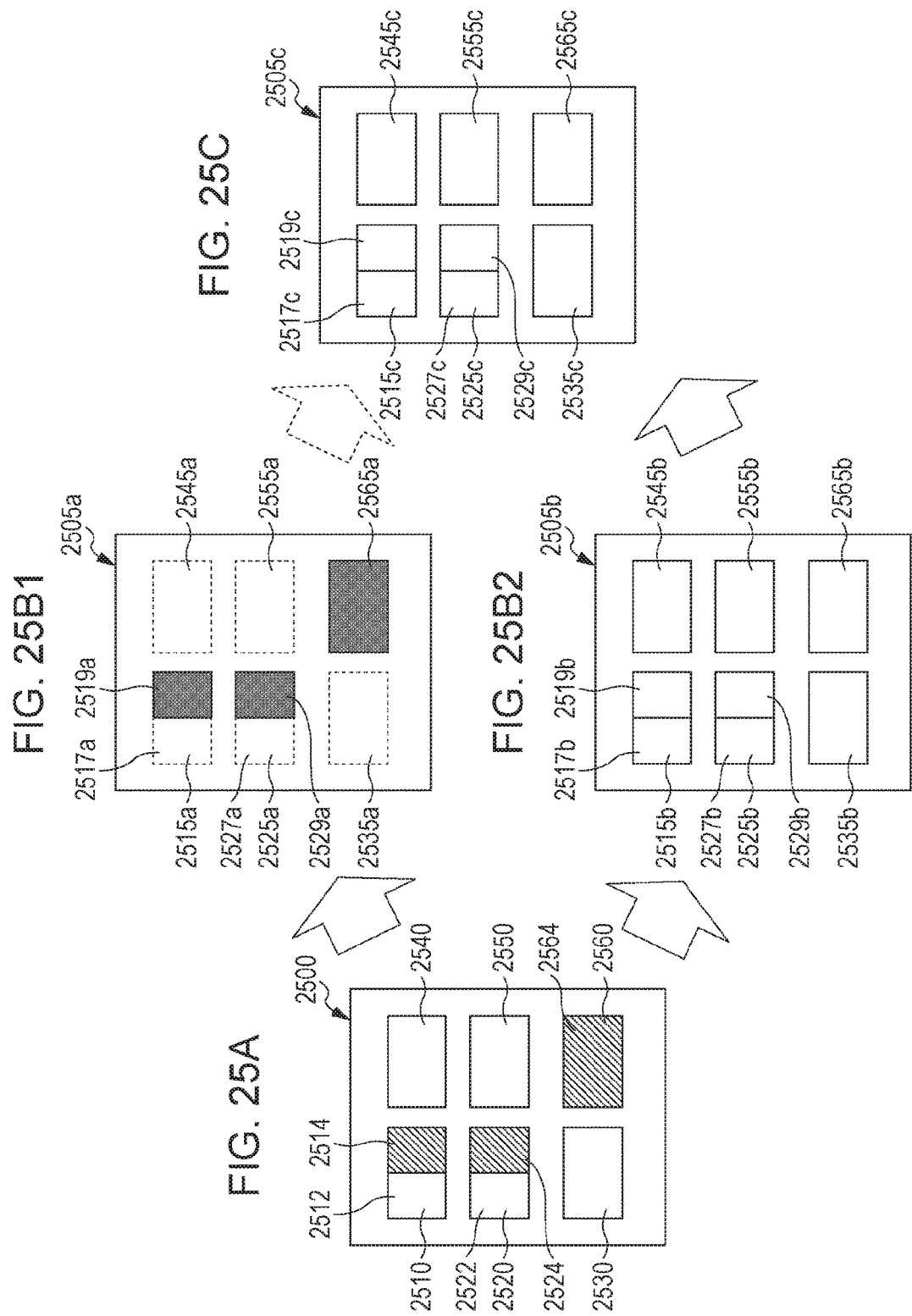

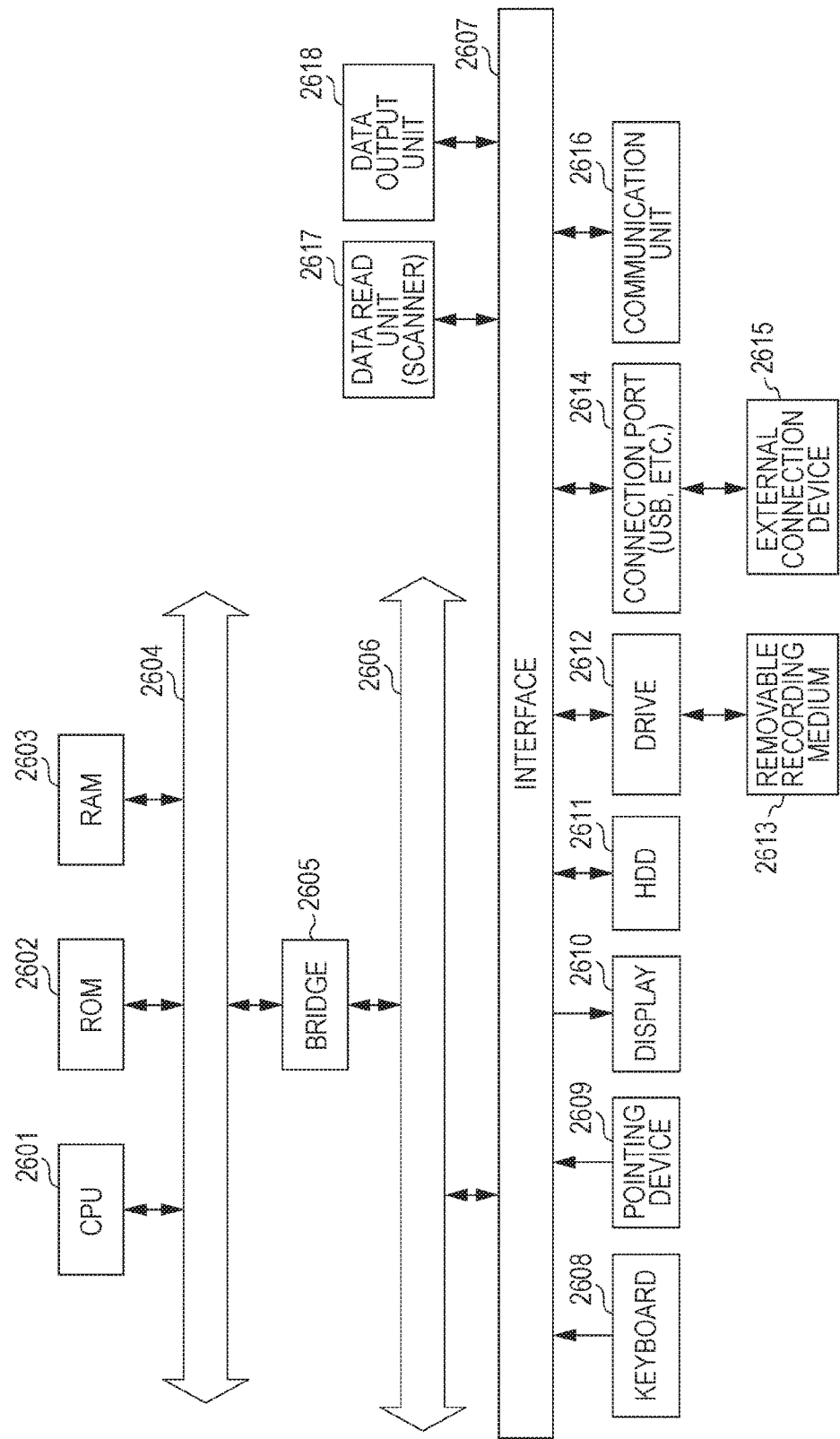

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-232398 filed Nov. 30, 2016.

BACKGROUND

Technical Field

The present invention relates to an image processing apparatus and a non-transitory computer readable medium.

SUMMARY

According to an aspect of the invention, there is provided an image processing apparatus including a first detection unit and a second detection unit. The first detection unit detects a rectangular shape in an image including plural document images. The second detection unit detects, in a case where a background of the rectangular shape is not white, rectangular shapes included in the rectangular shape detected by the first detection unit as document images.

BRIEF DESCRIPTION OF THE DRAWINGS

Exemplary embodiments of the present invention will be described in detail based on the following figures, wherein:

FIG. 1 is a block diagram schematically illustrating an example module configuration according to a first exemplary embodiment;

FIGS. 3A to 3C are explanatory diagrams illustrating example target images in the first exemplary embodiment;

FIGS. 4A1 to 4B are explanatory diagrams illustrating example processes for extracting document images without employing the first exemplary embodiment;

FIGS. 12A to 12C are explanatory diagrams illustrating an example process according to the first exemplary embodiment;

FIG. 14 is an explanatory diagram illustrating an example data structure of a process result table;

FIGS. 16A1 to 16B2 are explanatory diagrams illustrating example processes for extracting document images without employing the second exemplary embodiment;

FIGS. 20A to 20C4 are explanatory diagrams illustrating an example process according to the second exemplary embodiment;

FIG. 21 is a flowchart illustrating an example process according to the second exemplary embodiment;

FIGS. 25A to 25C are explanatory diagrams illustrating an example process according to the second exemplary embodiment; and FIG. 26 is a block diagram illustrating an example hardware configuration of a computer used to implement exemplary embodiments of the present invention.

DETAILED DESCRIPTION

Figure 2A:
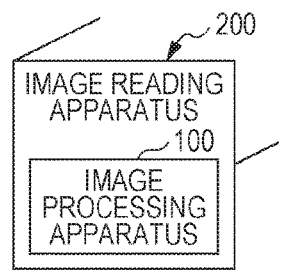
FIGS. 2A and 2B are explanatory diagrams illustrating example system configurations employing an exemplary embodiment of the present invention.

Hereinafter, exemplary embodiments of the present invention will be described with reference to the drawings.
First Exemplary Embodiment FIG. 1 is a block diagram schematically illustrating an example module configuration according to a first exemplary embodiment.

Note that a module generally refers to a software component (computer program), a hardware component, or any other type of component that is logically isolatable. Therefore, modules described in exemplary embodiments of the present invention refer to not only modules in a computer program but also modules in a hardware configuration. Accordingly, description is given in exemplary embodiments of the present invention also for describing a computer program for causing a computer to function as the modules (a program for causing a computer to perform the procedures of the modules, a program for causing a computer to function as the units of the modules, or a program for causing a computer to implement the functions of the modules), a system, and a method. Although the terms "store" and "be stored" and terms similar to "store" and "be stored" are used for convenience of description, these terms mean to store something on a storage device or to perform control to store something on a storage device in a case where an exemplary embodiment relates to a computer program. Although one module may correspond to one function, one module may be configured by using one program, or plural modules may be configured by using one program in implementation. Alternatively, one module may be configured by using plural programs. Plural modules may be executed by one computer, or one module may be executed by plural computers that are in a distributed or parallel environment. One module may include another module. The term "connection" described below is used in a case of a physical connection and also in a case of a logical connection (such as an exchange of data, an instruction, a reference relation between pieces of data, and so on). The term "predetermined" means that something is determined prior to a target process and is used to mean that something is determined before a process according to an exemplary embodiment of the present invention starts, as a matter of course, or before a target process starts even after a process according to an exemplary embodiment of the present invention has started, in accordance with the situation or condition at the time or the situation or condition up to the time. In a case where plural "predetermined values" are present, the values may differ from one another, or two or more of the values (or all values, as a matter of course) may be the same. A description "if A, then B is performed" is used to mean that "it is determined whether A or not and, if it is determined to be A, B is performed", except for a case where determination as to whether A or not is not necessary.

The term "system or apparatus" corresponds to a configuration in which plural computers, hardware units, apparatuses, and so on are connected to one another via a communication system, such as a network (including one-to-one communication connections), and also corresponds to a configuration in which a system or an apparatus is constituted by one computer, one hardware unit, or one apparatus, for example. The term "apparatus" may be used as a synonym for the term "system". As a matter of course, the term "system" does not mean a mere social "mechanism" (social system), which is an artificial arrangement.

Target information is read from a storage device each time a process is performed by each module or, in a case where plural processes are performed by a module, each time each process is performed, and the result of processing is written to the storage device after the process has been performed. Accordingly, description of reading from a storage device before processing and writing to the storage device after processing may be omitted. A storage device mentioned here may include a hard disk, a random access memory (RAM), an external storage medium, a storage device connected via a communication line, a register in a central processing unit (CPU), and so on.

An image processing apparatus 100 of the first exemplary embodiment detects, from an image including plural document images, the document images, and includes a data read module 110, a rectangular shape detection module 120, a condition determination module 130, and an included-rectangular-shape detection module 140, as illustrated in the example in FIG. 1.

For example, an image of documents, such as business cards or receipts, is read, a character recognition process, for example, is performed, and a process for generating a business-card database or an accounting process, for example, is performed. In an image read (scan) process, plural documents placed on a read table (also called a document glass or platen) are read in a single scan process because the documents are small. Here, plural document images need to be extracted from one image obtained in a single scan process. In order to increase the precision of extraction of document images, a black backing sheet or a special folder (a document folder in which documents are inserted at predetermined places and the background behind the documents is black) is used (see Japanese Unexamined Patent Application Publication No. 2003-338920) because documents, such as business cards or receipts, are typically white. In a case of detecting plural documents by using a black backing sheet or a special folder, the black backing sheet, for example, needs to be placed so as to fit a corner of the platen area, otherwise the state is not correctly determined. For example, a black backing sheet 310*a* needs to be placed so as to fit a corner (lower left corner) of a document glass 300 (also called a platen), as illustrated in FIG. 3A. Note that the examples in FIGS. 3A to 3C are overhead views, and therefore, the plural documents lie beneath the black backing sheet 310*a* (on the back side thereof).

However, in a case where a typical operator attempts to have plural documents read, the operator may place the documents in an unexpected manner because of a lack of understanding or an operational error. For example, as illustrated in FIG. 3B1, the operator might not place a black backing sheet 310*b*1 so as to fit a corner of the document glass 300, as illustrated in FIG. 3B1, or may place a black backing sheet 310*b*2 obliquely relative to the document glass 300, as illustrated in FIG. 3B2. In these cases, a successful operation might not be performed with a technique other than that of an exemplary embodiment of the present invention (for example, with a technique described in Japanese Unexamined Patent Application Publication No. 2003-338920). In other words, strict operational restrictions may be imposed on the operator.

A backing sheet entirely colored in black (a borderless black backing sheet) might not be used. For example, as illustrated in FIG. 3C, a black backing sheet 310*c* has a black area 330 outlined by a white edge 320. Specifically, in a case where a copy operation is performed with the platen cover being left open, the black backing sheet 310*c* having a white edge is created because a borderless print function is generally not provided. In this case, even if the operator correctly places documents, the document images might not be detected with a technique other than that of an exemplary embodiment of the present invention (for example, a technique described in Japanese Unexamined Patent Application Publication No. 2003-338920).

FIGS. 4A1 to 4B are explanatory diagrams illustrating example processes for extracting document images without employing the first exemplary embodiment, and illustrate an example case of determining the color of the background of an image by using a predetermined area in the image. Two business cards are read by using a black backing sheet, and therefore, a business-card image 430 and a business-card image 435 in a backing sheet image 420 are to be detected as two document images. However, reading is performed with the black backing sheet being obliquely placed, and therefore, a white area is created outside the backing sheet image 420.

In the example illustrated in FIG. 4A1, a backing sheet color determination area 410*a*1 is an area in an upper portion on the left edge of an image 400*a*1. The backing sheet color determination area 410*a*1 is used to determine whether a black backing sheet is used. The backing sheet color determination area 410*a*1 is white, and therefore, it is determined that a black backing sheet is not used.

In the example illustrated in FIG. 4A2, a backing sheet color determination area 410*a*2 is a peripheral area along the four edges of an image 400*a*2. The backing sheet color determination area 410*a*2 is used to determine whether a black backing sheet is used. In the example illustrated in FIG. 4A2, the area wider than that in the example illustrated in FIG. 4A1 is used in determination. However, the backing sheet color determination area 410*a*2 is white, and therefore, it is determined that a black backing sheet is not used.

In the example processes illustrated in FIGS. 4A1 and 4A2, an image 450 is detected as an image of a business card, as illustrated in FIG. 4B. That is, a business-card image 460 and a business-card image 465, which need to be detected, are not detected.

The data read module 110 is connected to the rectangular shape detection module 120. The data read module 110 receives an image that includes plural document images. Receiving an image is reading an image by using, for example, a scanner or a camera, receiving an image from an external device via a communication line by using, for example, a facsimile machine, or reading an image stored in, for example, a hard disk (a hard disk that is built in the image processing apparatus 100 or a hard disk that is connected to the image processing apparatus 100 over a network), for example. The image is a multi-value image (may be a color image).

In a case where a document is read, the document may be read by using a backing sheet in a color other than white (for example, a dark color with low brightness, such as black, dark blue, or dark gray, or a color, such as a metallic color, having varying reflection properties for read light, which is hereinafter referred to as "black" in this exemplary embodiment) or may be read by using a white backing sheet. The color of the backing sheet is the background color of the image. A document may be read without using a backing sheet. In this case, the color of the back side of the platen cover (for example, white) is the background color of the image. A predetermined backing sheet (which is an accessory, for example, of a product in which the image processing apparatus 100 is built) may be used, or a backing sheet provided by the operator may be used. For example, a borderless black backing sheet or a black backing sheet with a white edge as described above may be used. Further, it is recommended to place the black backing sheet 310 so as to fit a corner of the document glass 300; however, the black backing sheet 310 may be placed so as to be apart from a corner or may be obliquely placed as illustrated in the above-described examples in FIGS. 3B1 and 3B2.

Note that the operator may be recommended to use a black backing sheet when they are to have plural documents read. For example, in a case where an instruction for "having plural documents read" is provided, for example, use of a black backing sheet may be suggested on a display. However, the operator does not necessarily use a black backing sheet in accordance with the suggestion.

The rectangular shape detection module 120 is connected to the data read module 110 and the condition determination module 130. The rectangular shape detection module 120 detects rectangular shapes in an image that includes plural document images.

The rectangular shape detection module 120 may detect the outermost rectangular shape in a target image. The "outermost rectangular shape" is a rectangular shape that is determined by taking into consideration an inclusion relation and is a rectangular shape that is not included in any other rectangular shape. Determination as to whether a rectangular shape is included in another rectangular shape may be performed by distinguishing an area inside the rectangular shape from an area outside the rectangular shape on the basis of the coordinates of each corner of the rectangular shape and determining the inclusion relation with the other rectangular shape. Alternatively, a target image may be scanned from the outer edge thereof, and a rectangular shape that is detected first may be determined to be the outermost rectangular shape.

Plural "outermost rectangular shapes" may be present. For example, in a case where the background of an image is white, the "outermost rectangular shape" is a rectangular shape of any document image, and therefore, rectangular shapes are extracted for the number of documents.

In a case where the background of an image is black, one backing sheet is typically used, and therefore, one outermost rectangular shape is present. However, in a case where plural backing sheets are used, plural outermost rectangular shapes may be present. For example, there may be a case where two black background areas are present in an image. This case specifically corresponds to a case where two bordered black backing sheets are arranged side by side and scanned. The bordered black backing sheets create black background areas. In this case, two bordered black backing sheets are arranged side by side, and therefore, the "outermost rectangular shapes" are the two black areas.

The condition determination module 130 is connected to the rectangular shape detection module 120 and the included-rectangular-shape detection module 140. The condition determination module 130 determines whether the background of a rectangular shape detected by the rectangular shape detection module 120 is white in accordance with a predetermined condition. Here, the "background of a rectangular shape" is the base of the rectangular shape. The "case where the background is not white" may be a "case where the background is black" or a "case where the background is gray", for example. In the following description, as an example of the case of "not white", the case of "black" is used. The case where the background is not white means that document images are read by using a recommended backing sheet (for example, a black backing sheet). The case where the background is white means that document images are read without using a backing sheet or by using a backing sheet (for example, a backing sheet with a white edge) other than a recommended backing sheet. Note that plural predetermined conditions may be prepared, and a condition to be applied may be selected from among the plural conditions in accordance with the combination of the backing sheet and documents.

As the predetermined condition, a comparison between the number of rectangular shapes detected by the rectangular shape detection module 120 and a predetermined threshold may be used.

As the predetermined condition, a comparison between the number of black pixels or the number of white pixels in a predetermined area in a rectangular shape detected by the rectangular shape detection module 120 and a predetermined threshold may be used. Here, the "comparison between the number of black pixels or the number of white pixels and a predetermined threshold" is any of "a comparison between the number of black pixels and a predetermined threshold", "a comparison between the number of white pixels and a predetermined threshold" and "a comparison between the number of black pixels and a predetermined threshold and a comparison between the number of white pixels and a predetermined threshold", as a matter of course.

As the predetermined condition, a comparison between the size of a rectangular shape detected by the rectangular shape detection module 120 and a predetermined threshold may be used. A rectangular shape having a size equal to or smaller than a predetermined size is highly likely to correspond to a document. Therefore, it is possible to suppress erroneous processing in which a document is determined to be a backing sheet.

As the predetermined condition, a comparison between the number of rectangular shapes included in a rectangular shape detected by the rectangular shape detection module 120 and a predetermined threshold may be used. If the detected rectangular shape includes no rectangular shape, the detected rectangular shape is highly likely to correspond to a document.

Note that the determination process performed by the condition determination module 130 may be performed by using a reduced image, and a process for cutting document images for output may be performed by using the image having the original resolution. Accordingly, it is possible to quickly perform the determination process in which a slight shift in a detection area is reduced because of the reduced image and determination is robustly performed.

The included-rectangular-shape detection module 140 is connected to the condition determination module 130. In a case where the background of a rectangular shape detected by the rectangular shape detection module 120 is not white (in a case where the result of determination by the condition determination module 130 is not white), the included-rectangular-shape detection module 140 detects any rectangular shape included in the detected rectangular shape as a document image.

In a case where the background of a rectangular shape detected by the rectangular shape detection module 120 is white, the included-rectangular-shape detection module 140 may detect the rectangular shape detected by the rectangular shape detection module 120 as a document image.

The included-rectangular-shape detection module 140 generates a process result table 1400, for example, as a result of processing. FIG. 14 is an explanatory diagram illustrating an example data structure of the process result table 1400. The process result table 1400 includes an image identification (ID) column 1405, a number-of-document-images column 1410, a document image ID column 1415, a vertex A column 1420, a vertex B column 1425, a vertex C column 1430, and a vertex D column 1435, for example. In the image ID column 1405, information (image ID) for uniquely identifying an image received by the data read module 110 in an exemplary embodiment of the present invention is stored. In the number-of-document-images column 1410, the number of document images is stored. Subsequent to the number-of-document-images column 1410, a set of columns from the document image ID column 1415 to the vertex D column 1435 are provided for the number of document images. In the document image ID column 1415, information (document image ID) for uniquely identifying a document image is stored in an exemplary embodiment of the present invention. In the vertex A column 1420, the coordinates of a vertex A are stored. In the vertex B column 1425, the coordinates of a vertex B are stored. In the vertex C column 1430, the coordinates of a vertex C are stored. In the vertex D column 1435, the coordinates of a vertex D are stored.

The included-rectangular-shape detection module 140 outputs the image and the process result table 1400, or extracts document images from the image by referring to the process result table 1400 and outputs the document images. Outputting the extracted document images is printing the document images by using a printer, displaying the document images on a display, transmitting the document images by using an image transmission apparatus, such as a facsimile machine, writing the document images to an image storage device, such as an image database, storing the document images in a storage medium, such as a memory card, or passing the document images to another information processing apparatus (for example, a document processing apparatus 250 described below), for example.

Figure 2B:
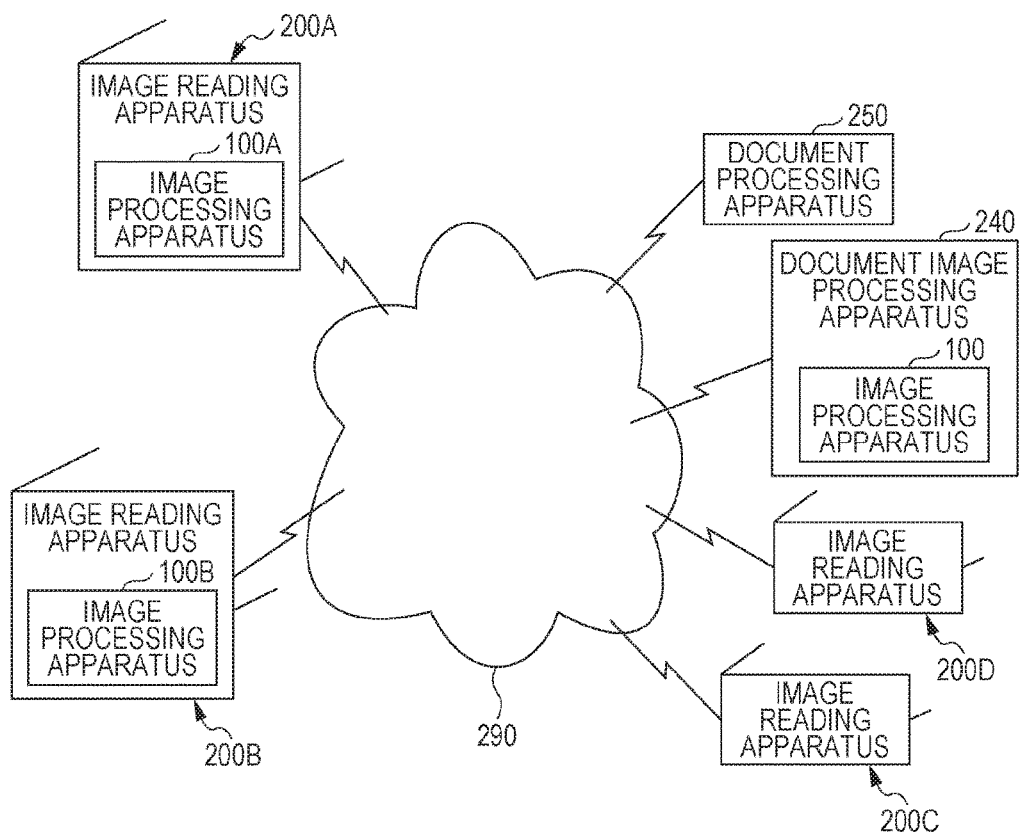

FIGS. 2A and 2B are explanatory diagrams illustrating example system configurations employing an exemplary embodiment of the present invention.

The example in FIG. 2A illustrates a case of a stand-alone configuration. An image reading apparatus 200 includes the image processing apparatus 100.

For example, an operator places plural documents on the platen of the image reading apparatus 200 and instructs the image processing apparatus 100 to perform a process for extracting plural document images. As a backing sheet that serves as the background, a black backing sheet may be used or a white backing sheet may be used. The result of extraction may be printed or output to a universal serial bus (USB) memory, for example.

The example in FIG. 2B illustrates a case where a system is configured by using a communication line 290. An image reading apparatus 200A, an image reading apparatus 200B, an image reading apparatus 200C, an image reading apparatus 200D, a document image processing apparatus 240, and the document processing apparatus 250 are connected to one another via the communication line 290. The communication line 290 may be a wireless line, a wired line, or a combination of a wireless line and a wired line, or may be the Internet or an intranet, for example, that serves as a communication infrastructure. Functions implemented by the document image processing apparatus 240 and the document processing apparatus 250 may be implemented as cloud services.

The image reading apparatus 200A includes an image processing apparatus 100A. The image reading apparatus 200B includes an image processing apparatus 100B. The document image processing apparatus 240 includes the image processing apparatus 100.

For example, an operator places plural documents on the platen of the image reading apparatus 200A. As a backing sheet that serves as the background, a black backing sheet may be used or a white backing sheet may be used. Then, the operator instructs the image processing apparatus 100A to perform a process for extracting plural document images. The image processing apparatus 100A transmits to the document processing apparatus 250 an image that includes the plural document images and the process result table 1400 that includes the result of extraction, or the document images extracted from the image by referring to the process result table 1400. The document processing apparatus 250 performs a character recognition process on the document images, and performs a process for generating a business-card database in a case where the document images are images of business cards, or an accounting process in a case where the document images are images of receipts, for example.

The image reading apparatus 200C and the image reading apparatus 200D that do not include the image processing apparatus 100 may use the document image processing apparatus 240. For example, an operator places plural documents on the platen of the image reading apparatus 200C. As a backing sheet that serves as the background, a black backing sheet may be used or a white backing sheet may be used. The image reading apparatus 200C reads the documents and transmits an image obtained as a result of reading to the document image processing apparatus 240. The image processing apparatus 100 in the document image processing apparatus 240 performs a process for extracting plural document images, and the document image processing apparatus 240 performs, on the result of the extraction process, a process (a process for generating a business-card database or an accounting process, for example) similar to that performed by the document processing apparatus 250.

Figure 5:
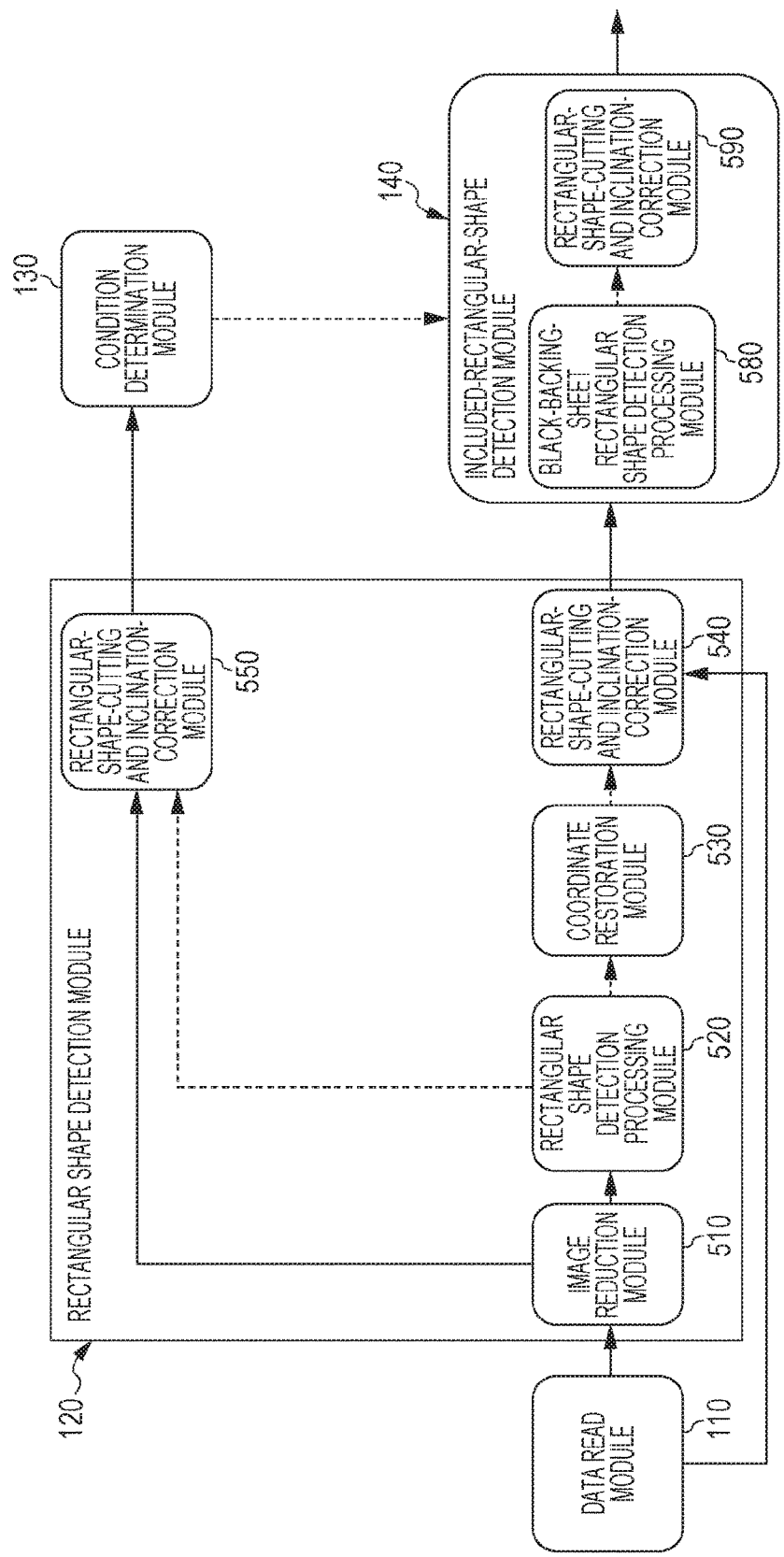
FIG. 5 is a block diagram schematically illustrating an example module configuration according to the first exemplary embodiment.

FIG. 5 is a block diagram schematically illustrating an example module configuration according to the first exemplary embodiment and illustrates the details of the example module configuration illustrated in FIG. 1.

The data read module 110 is connected to an image reduction module 510 and a rectangular-shape-cutting and inclination-correction module 540 included in the rectangular shape detection module 120. The data read module 110 passes a received image to the image reduction module 510 and the rectangular-shape-cutting and inclination-correction module 540.

The rectangular shape detection module 120 includes the image reduction module 510, a rectangular shape detection processing module 520, a coordinate restoration module 530, the rectangular-shape-cutting and inclination-correction module 540, and a rectangular-shape-cutting and inclination-correction module 550.

The image reduction module 510 is connected to the data read module 110, the rectangular shape detection processing module 520, and the rectangular-shape-cutting and inclination-correction module 550. The rectangular shape detection module 120 determines at a low resolution whether a black backing sheet is used. Therefore, the image reduction module 510 reduces an image received by the data read module 110. The image reduction module 510 may reduce an image at a predetermined reduction ratio or reduce an image to an image having a predetermined size. The reduction process is performed by using an existing technique. For example, simple sampling may be performed. The image reduction module 510 passes an image obtained as a result of reduction to the rectangular shape detection processing module 520 and the rectangular-shape-cutting and inclination-correction module 550.

The rectangular shape detection processing module 520 is connected to the image reduction module 510, the coordinate restoration module 530, and the rectangular-shape-cutting and inclination-correction module 550. The rectangular shape detection processing module 520 detects the outermost rectangular shape in the reduced image. For example, the rectangular shape detection processing module 520 may perform processing that is performed by a fixed-darkness-difference calculation module 1530 or an edge component calculation module 1540 in a second exemplary embodiment described below. The rectangular shape detection processing module 520 passes the result of processing (coordinate information, for example) to the coordinate restoration module 530 and the rectangular-shape-cutting and inclination-correction module 550.

The coordinate restoration module 530 is connected to the rectangular shape detection processing module 520 and the rectangular-shape-cutting and inclination-correction module 540. The coordinate restoration module 530 restores the coordinate information detected by the rectangular shape detection processing module 520 to the coordinates before reduction (performs enlargement). The coordinate restoration module 530 passes the restored coordinate information to the rectangular-shape-cutting and inclination-correction module 540.

The rectangular-shape-cutting and inclination-correction module 540 is connected to the data read module 110, the coordinate restoration module 530, and the included-rectangular-shape detection module 140. The rectangular-shape-cutting and inclination-correction module 540 uses the coordinate information restored by the coordinate restoration module 530 to extract an image of a rectangular shape from the image received by the data read module 110 and make an inclination correction. The inclination correction is made by using an existing technique. For example, an affine transformation (rotation process) may be performed on the basis of the coordinate information so that each edge is horizontally or vertically aligned. The rectangular-shape-cutting and inclination-correction module 540 passes an image of a rectangular shape obtained as a result of processing to the included-rectangular-shape detection module 140.

The rectangular-shape-cutting and inclination-correction module 550 is connected to the image reduction module 510, the rectangular shape detection processing module 520, and the condition determination module 130. The rectangular-shape-cutting and inclination-correction module 550 uses the coordinate information detected by the rectangular shape detection processing module 520 to extract an image of a rectangular shape from the image reduced by the image reduction module 510 and make an inclination correction. The rectangular-shape-cutting and inclination-correction module 550 is different from the rectangular-shape-cutting and inclination-correction module 540 in that the reduced image is processed. Determination as to whether a black backing sheet is used is satisfactorily performed by using the reduced image. The reduced image is used to reduce the processing load and to increase the processing speed. The rectangular-shape-cutting and inclination-correction module 550 passes an image of a rectangular shape obtained as a result of processing to the condition determination module 130.

The condition determination module 130 is connected to the rectangular-shape-cutting and inclination-correction module 550 of the rectangular shape detection module 120 and to the included-rectangular-shape detection module 140. The condition determination module 130 determines whether the background of the rectangular shape obtained as a result of processing by the rectangular-shape-cutting and inclination-correction module 550 is black in accordance with a predetermined condition. The details of this process are described below with reference to the example in FIG. 10.

The included-rectangular-shape detection module 140 includes a black-backing-sheet rectangular shape detection processing module 580 and a rectangular-shape-cutting and inclination-correction module 590 and is connected to the rectangular-shape-cutting and inclination-correction module 540 of the rectangular shape detection module 120 and to the condition determination module 130. The included-rectangular-shape detection module 140 creates the process result table 1400 in accordance with the result of determination by the condition determination module 130. Specifically, in a case where the condition determination module 130 determines that "a black backing sheet is used", the included-rectangular-shape detection module 140 causes the black-backing-sheet rectangular shape detection processing module 580 and the rectangular-shape-cutting and inclination-correction module 590 to perform processing and creates the process result table 1400. In a case where the condition determination module 130 determines that "a black backing sheet is not used", the included-rectangular-shape detection module 140 creates the process result table 1400 by using the result obtained by the rectangular-shape-cutting and inclination-correction module 540. That is, in the case where "a black backing sheet is not used", processing performed by the black-backing-sheet rectangular shape detection processing module 580 and the rectangular-shape-cutting and inclination-correction module 590 is not necessary. This is because, in the case where "a black backing sheet is not used" (in a case where the background is white), document images have been detected as a result of processing by the rectangular shape detection module 120.

The black-backing-sheet rectangular shape detection processing module 580 is connected to the rectangular-shape-cutting and inclination-correction module 590. The black-backing-sheet rectangular shape detection processing module 580 detects rectangular shapes included in the result of detection (an image of a rectangular shape for which an inclination correction has been made) by the rectangular-shape-cutting and inclination-correction module 540. For example, the black-backing-sheet rectangular shape detection processing module 580 may perform processing that is performed by the fixed-darkness-difference calculation module 1530, the edge component calculation module 1540, or an image processing apparatus 1500 according to the second exemplary embodiment described below. It is determined that a black backing sheet is used, and therefore, processing performed by the fixed-darkness-difference calculation module 1530 or the image processing apparatus 1500 is effective. Specifically, in a case where a document is specially designed, processing performed by the image processing apparatus 1500 is effective.

The rectangular-shape-cutting and inclination-correction module 590 is connected to the black-backing-sheet rectangular shape detection processing module 580. The rectangular-shape-cutting and inclination-correction module 590 uses coordinate information detected by the black-backing-sheet rectangular shape detection processing module 580 to extract document images from an image of a rectangular shape extracted by the rectangular-shape-cutting and inclination-correction module 540 and make an inclination correction. The rectangular-shape-cutting and inclination-correction module 590 is different from the rectangular-shape-cutting and inclination-correction module 540 in that an image extracted by the rectangular-shape-cutting and inclination-correction module 540 is processed instead of an image received by the data read module 110.

Figure 6:
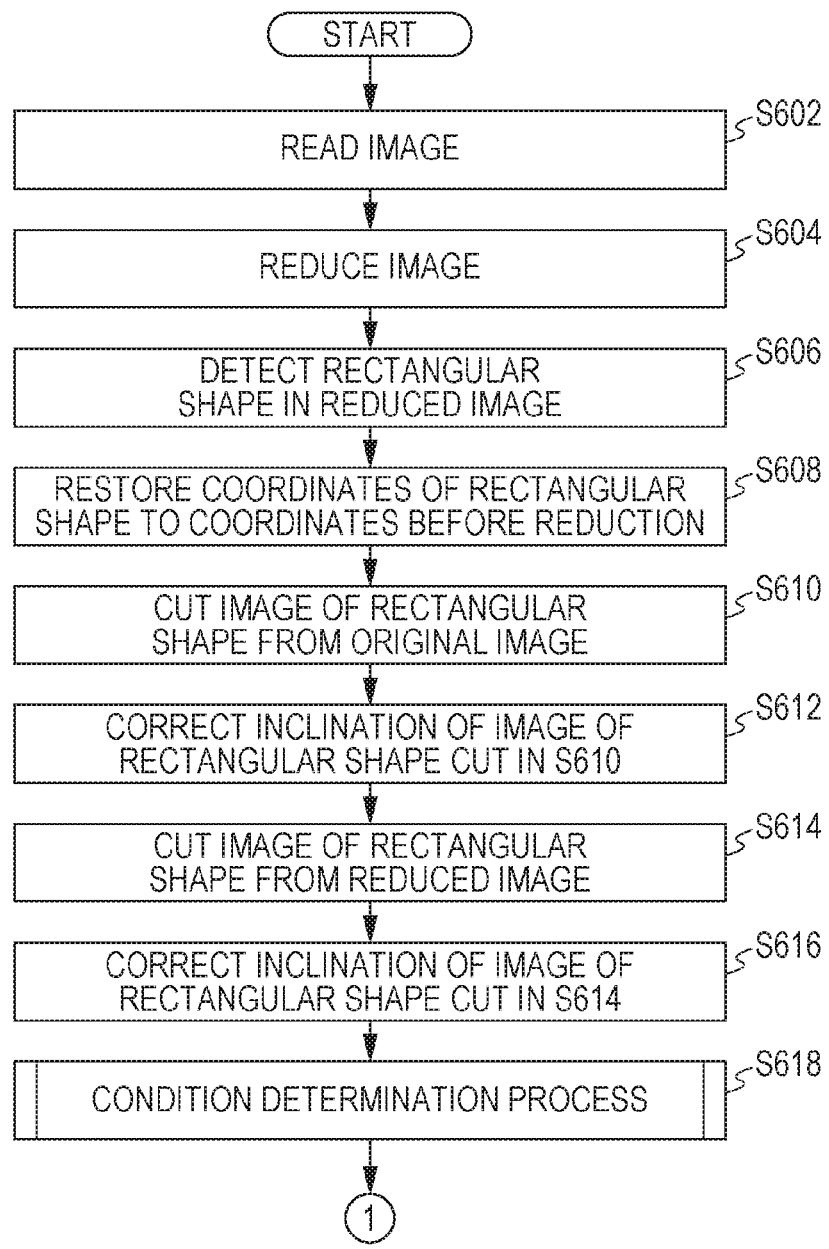
FIG. 6 is a flowchart illustrating an example process according to the first exemplary embodiment.
Figure 7:
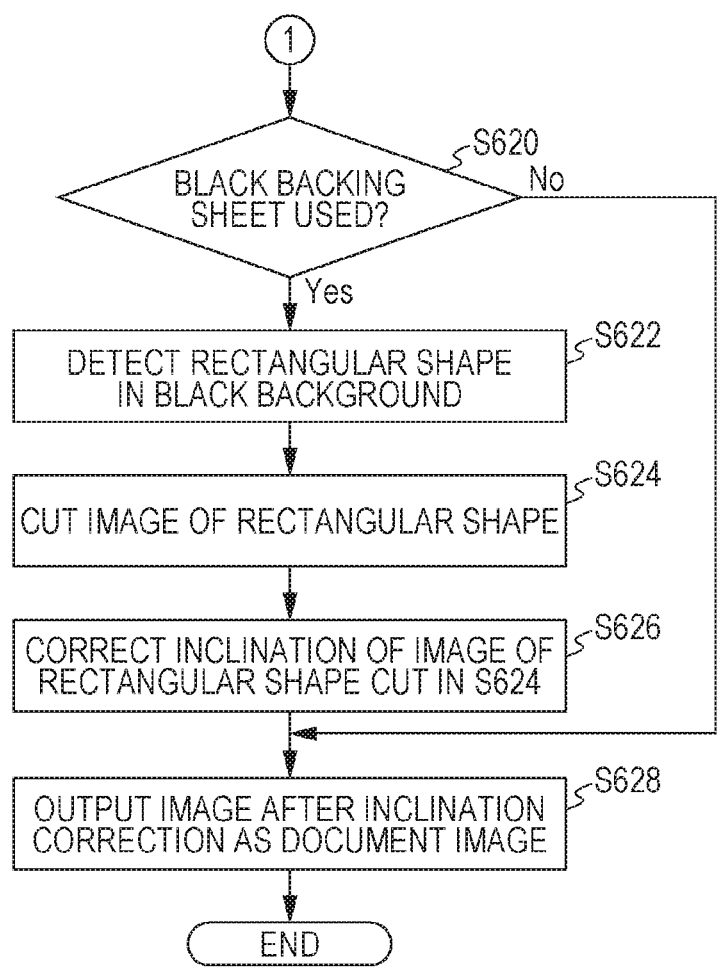
FIG. 7 is a flowchart illustrating an example process according to the first exemplary embodiment.

FIG. 6 and FIG. 7 are flowcharts illustrating an example process according to the first exemplary embodiment.

In step S602, the data read module 110 reads an image.

In step S604, the image reduction module 510 reduces the image.

In step S606, the rectangular shape detection processing module 520 detects a rectangular shape in the reduced image.

In step S608, the coordinate restoration module 530 restores the coordinates of the rectangular shape to those before reduction.

In step S610, the rectangular-shape-cutting and inclination-correction module 540 cuts an image of the rectangular shape from the original image.

In step S612, the rectangular-shape-cutting and inclination-correction module 540 corrects inclination of the rectangular shape cut in step S610.

In step S614, the rectangular-shape-cutting and inclination-correction module 550 cuts an image of a rectangular shape from the reduced image.

In step S616, the rectangular-shape-cutting and inclination-correction module 550 corrects inclination of the image of the rectangular shape cut in step S614.

In step S618, the condition determination module 130 performs a condition determination process. The details of the process in step S618 are described below with reference to the examples in FIGS. 10 to 13B.

In step S620, the condition determination module 130 determines whether a black backing sheet is used. If a black backing sheet is used, the flow proceeds to step S622, otherwise the flow proceeds to step S628.

In step S622, the black-backing-sheet rectangular shape detection processing module 580 detects any rectangular shape in the black background.

In step S624, the rectangular-shape-cutting and inclination-correction module 590 cuts an image of the rectangular shape.

In step S626, the rectangular-shape-cutting and inclination-correction module 590 corrects inclination of the image of the rectangular shape cut in step S624.

In step S628, the included-rectangular-shape detection module 140 outputs an image after inclination correction as a document image. The "image after inclination correction" is the result of processing in step S626 if it is determined that a black backing sheet is used (Yes in step S620), or is the result of processing in step S612 if it is determined that a black backing sheet is not used (No in step S620).

Figure 8:
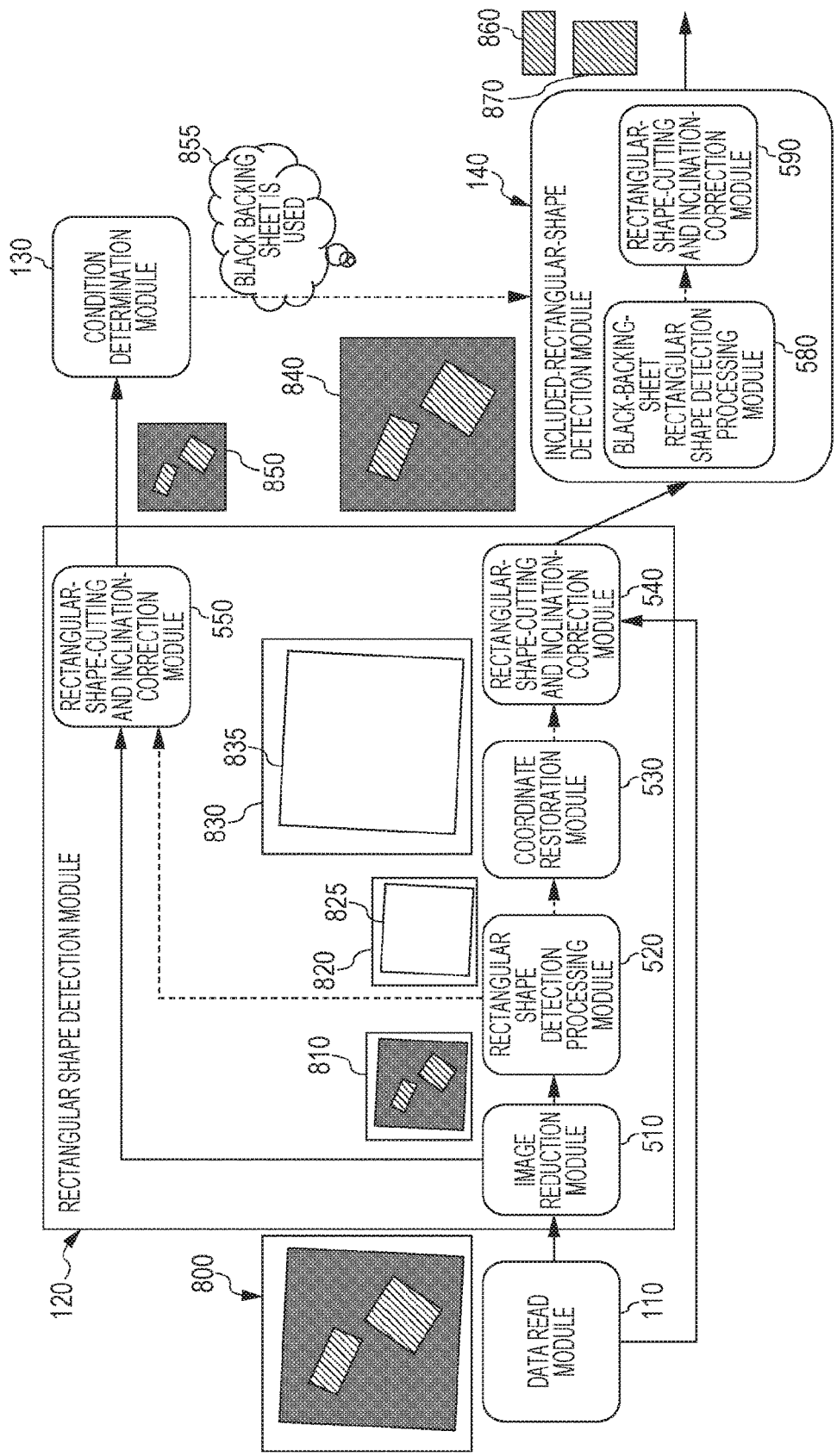
FIG. 8 is an explanatory diagram illustrating an example process according to the first exemplary embodiment.

FIG. 8 is an explanatory diagram illustrating an example process according to the first exemplary embodiment, and illustrates an example process performed in a case where reading using a black backing sheet is performed.

The data read module 110 receives an image 800. The image 800 is identical to the image illustrated in the example in FIGS. 4A1 to 4B. Although a black backing sheet is used, the black sheet is obliquely placed.

The image reduction module 510 reduces the image 800 and generates a reduced image 810.

The rectangular shape detection processing module 520 detects the outermost rectangular shape in the reduced image 810. The rectangular shape detection processing module 520 detects a rectangular shape 825 as a rectangular shape detection result 820.

The coordinate restoration module 530 performs restoration to the original size. The coordinate restoration module 530 generates a resulting restored rectangular shape 835 as a restoration result 830.

The rectangular-shape-cutting and inclination-correction module 540 uses the resulting restored rectangular shape 835 to cut a resulting cut image 840 from the image 800.

The rectangular-shape-cutting and inclination-correction module 550 uses the rectangular shape 825 to cut a resulting reduced cut image 850 from the reduced image 810.

The condition determination module 130 determines that "a black backing sheet is used" (855) from the resulting reduced cut image 850.

The included-rectangular-shape detection module 140 detects a document image 860 and a document image 870 in the resulting cut image 840.

Figure 9:
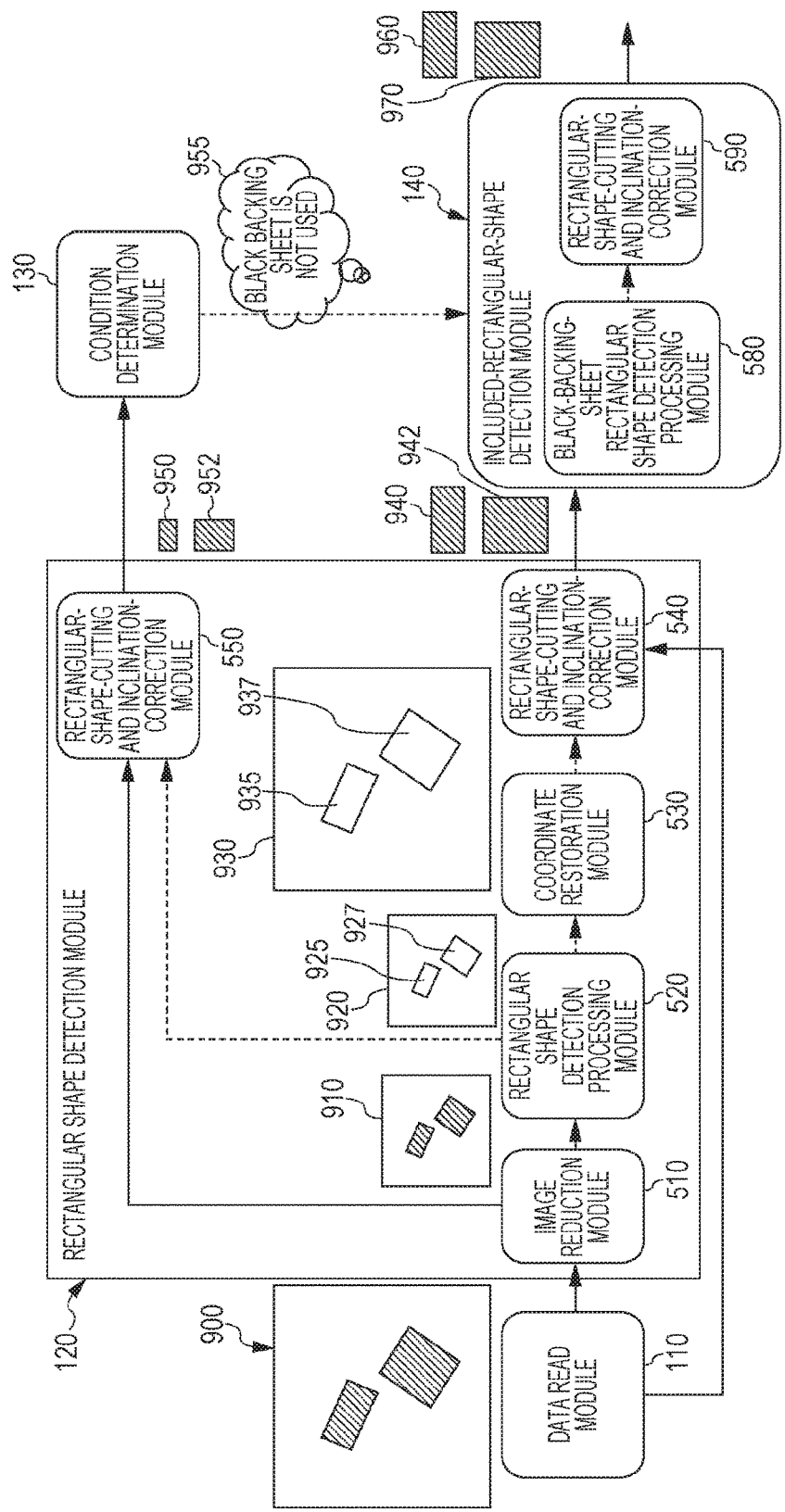
FIG. 9 is an explanatory diagram illustrating an example process according to the first exemplary embodiment.

FIG. 9 is an explanatory diagram illustrating an example process according to the first exemplary embodiment, and illustrates an example process performed in a case where reading using a white backing sheet is performed.

The data read module 110 receives an image 900. Regarding the image 900, a white backing sheet is used.

The image reduction module 510 reduces the image 900 and generates a reduced image 910.

The rectangular shape detection processing module 520 detects the outermost rectangular shape in the reduced image 910. The rectangular shape detection processing module 520 detects two rectangular shapes, namely, a rectangular shape 925 and a rectangular shape 927, as a rectangular shape detection result 920.

The coordinate restoration module 530 performs restoration to the original size. The coordinate restoration module 530 generates a resulting restored rectangular shape 935 and a resulting restored rectangular shape 937 as a restoration result 930.

The rectangular-shape-cutting and inclination-correction module 540 uses the resulting restored rectangular shape 935 and the resulting restored rectangular shape 937 to cut a resulting cut image 940 and a resulting cut image 942 from the image 900.

The rectangular-shape-cutting and inclination-correction module 550 uses the rectangular shape 925 and the rectangular shape 927 to cut a resulting reduced cut image 950 and a resulting reduced cut image 952 from the reduced image 910.

The condition determination module 130 determines that "a black backing sheet is not used" (955) from the resulting reduced cut image 950 and the resulting reduced cut image 952.

The included-rectangular-shape detection module 140 detects the resulting cut image 940 and the resulting cut image 942 as is as a document image 960 and a document image 970. That is, processing performed by the black-backing-sheet rectangular shape detection processing module 580 and the rectangular-shape-cutting and inclination-correction module 590 is not necessary.

Figure 10:
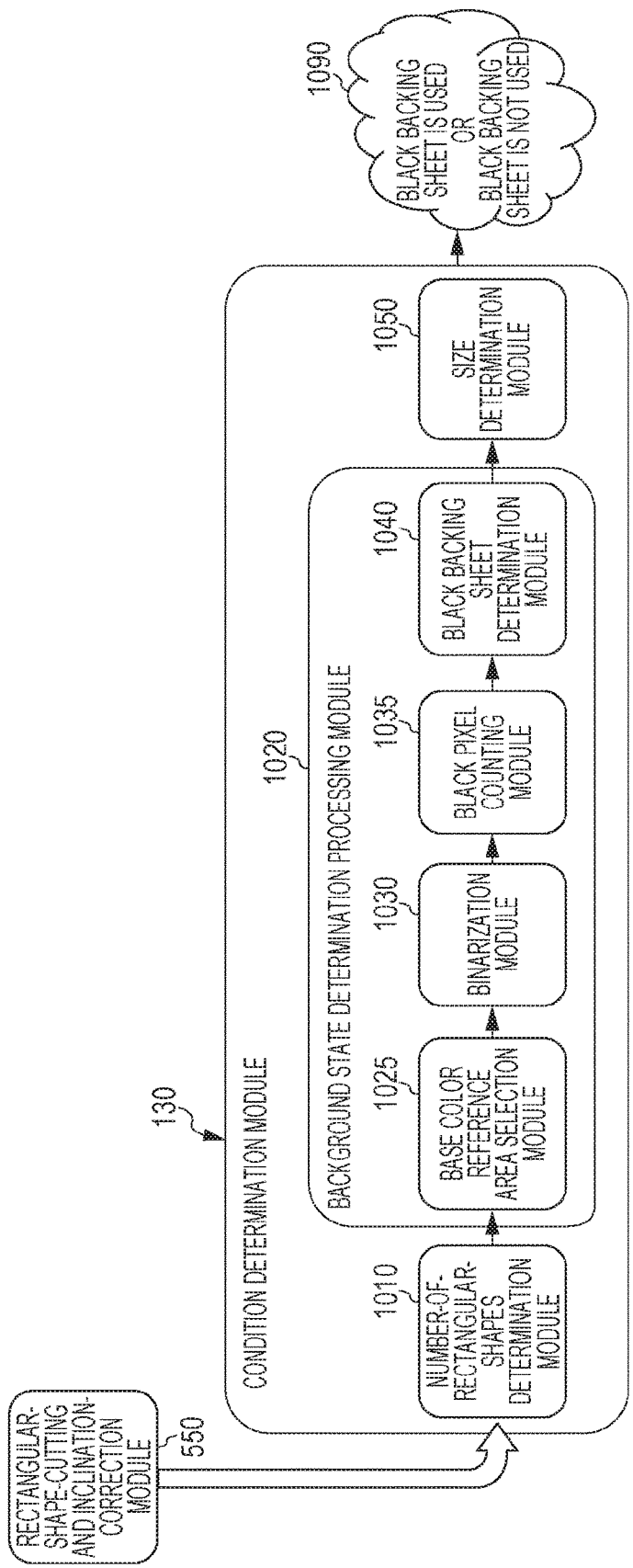
FIG. 10 is a block diagram schematically illustrating an example module configuration according to the first exemplary embodiment.

FIG. 10 is a block diagram schematically illustrating an example module configuration according to the first exemplary embodiment. Specifically, FIG. 10 illustrates a module configuration in the condition determination module 130.

The condition determination module 130 includes a number-of-rectangular-shapes determination module 1010, a background state determination processing module 1020, and a size determination module 1050.

The number-of-rectangular-shapes determination module 1010 is connected to a base color reference area selection module 1025 included in the background state determination processing module 1020. The number-of-rectangular-shapes determination module 1010 receives the resulting reduced cut image 850 in the example in FIG. 8 or the resulting reduced cut image 950 and the resulting reduced cut image 952 in the example in FIG. 9. The number-of-rectangular-shapes determination module 1010 determines that a white backing sheet is used (a black backing sheet is not used) if the number of received rectangular shapes is equal to or larger than a predetermined number. It is assumed that the predetermined number is two, for example. Then, in a case where the number of rectangular shapes is two or more, it is determined that a white backing sheet is used. In a case where the number of rectangular shapes is one, a determination process by the background state determination processing module 1020 is performed.

The background state determination processing module 1020 includes the base color reference area selection module 1025, a binarization module 1030, a black pixel counting module 1035, and a black backing sheet determination module 1040.

The base color reference area selection module 1025 is connected to the number-of-rectangular-shapes determination module 1010 and the binarization module 1030. The base color reference area selection module 1025 selects an area used to determine the base color (background color) of a target image (a reduced image of a rectangular shape).

The binarization module 1030 is connected to the base color reference area selection module 1025 and the black pixel counting module 1035. The binarization module 1030 performs a binarization process, such as simple binarization (fixed binarization process), on an image within an area selected by the base color reference area selection module 1025.

The black pixel counting module 1035 is connected to the binarization module 1030 and the black backing sheet determination module 1040. The black pixel counting module 1035 counts black pixels obtained as a result of the binarization process.

The black backing sheet determination module 1040 is connected to the black pixel counting module 1035 and the size determination module 1050. The black backing sheet determination module 1040 determines whether a white backing sheet is used (a black backing sheet is not used) by using the number of black pixels.

The size determination module 1050 is connected to the black backing sheet determination module 1040 of the background state determination processing module 1020. The size determination module 1050 determines whether the size of a rectangular shape cut by the rectangular-shape-cutting and inclination-correction module 550 is equal to or smaller than a predetermined size. It is assumed that the predetermined size is "B5", for example. Then, in a case where the size of the rectangular shape is equal to or smaller than "B5", it is determined that a white backing sheet is used.

In a case where the size of the rectangular shape is larger than the predetermined size, the number of rectangular shapes B included in the rectangular shape cut by the rectangular-shape-cutting and inclination-correction module 550 is counted. If the number of rectangular shapes B is smaller than a predetermined number, it is determined that a white backing sheet is used (a black backing sheet is not used). It is assumed that the predetermined number is one, for example. Then, in a case where the number of rectangular shapes B is zero (in a case where no rectangular shape B is present), it is determined that a white backing sheet is used. In a case where the number of rectangular shapes B is one or more, it is determined that a black backing sheet is used. To detect rectangular shapes B, processing by the fixed-darkness-difference calculation module 1530 in the second exemplary embodiment described below may be performed or processing by the image processing apparatus 1500 may be performed, for example.

The condition determination module 130 outputs the result of determination, namely, "a black backing sheet is used or a black backing sheet is not used" (1090). Specifically, the result of determination is "a black backing sheet is used" (855) illustrated in the example in FIG. 8 or "a black backing sheet is not used" (955) illustrated in the example in FIG. 9.

Figure 11:
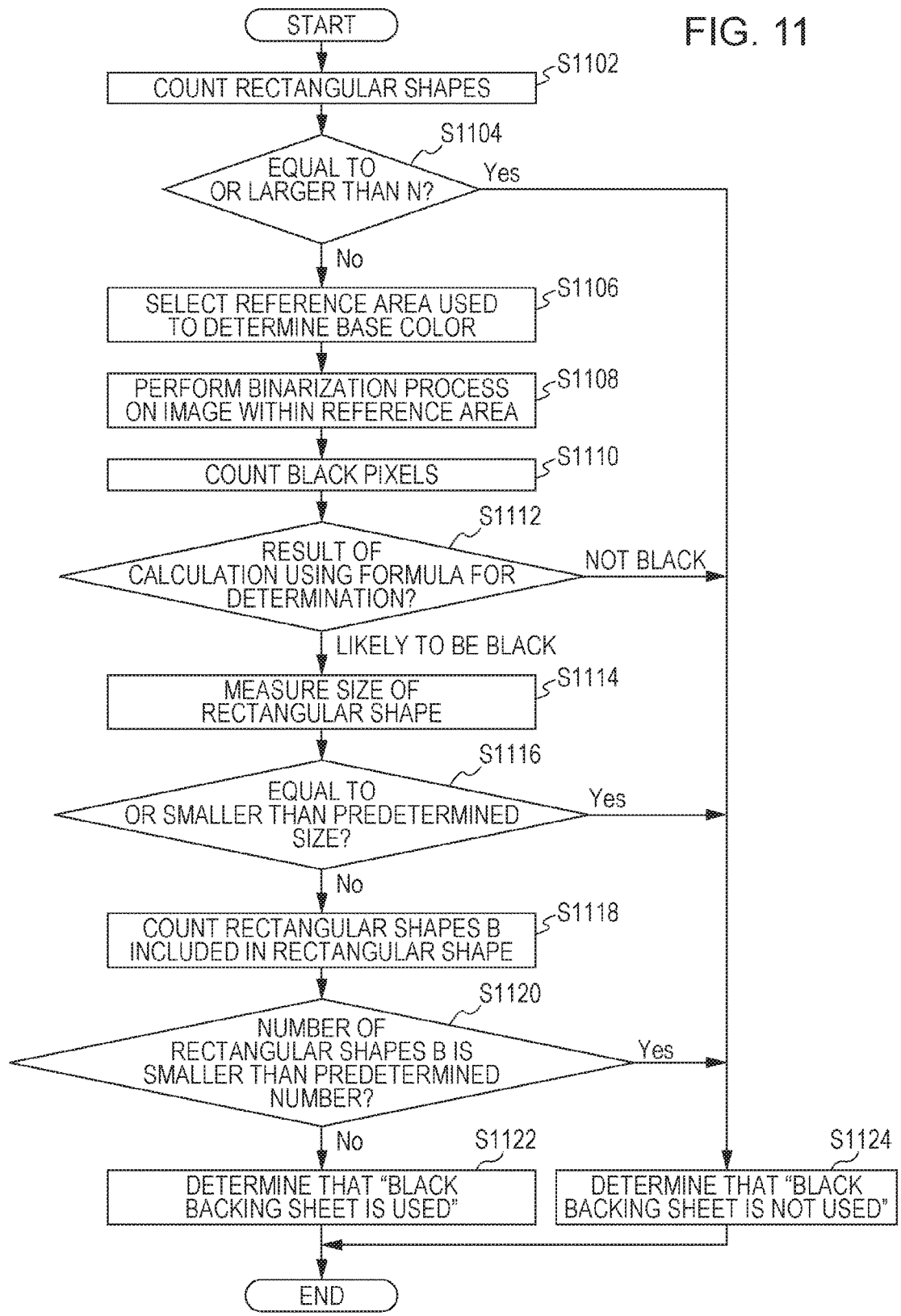
FIG. 11 is a flowchart illustrating an example process according to the first exemplary embodiment.
Figure 13A:
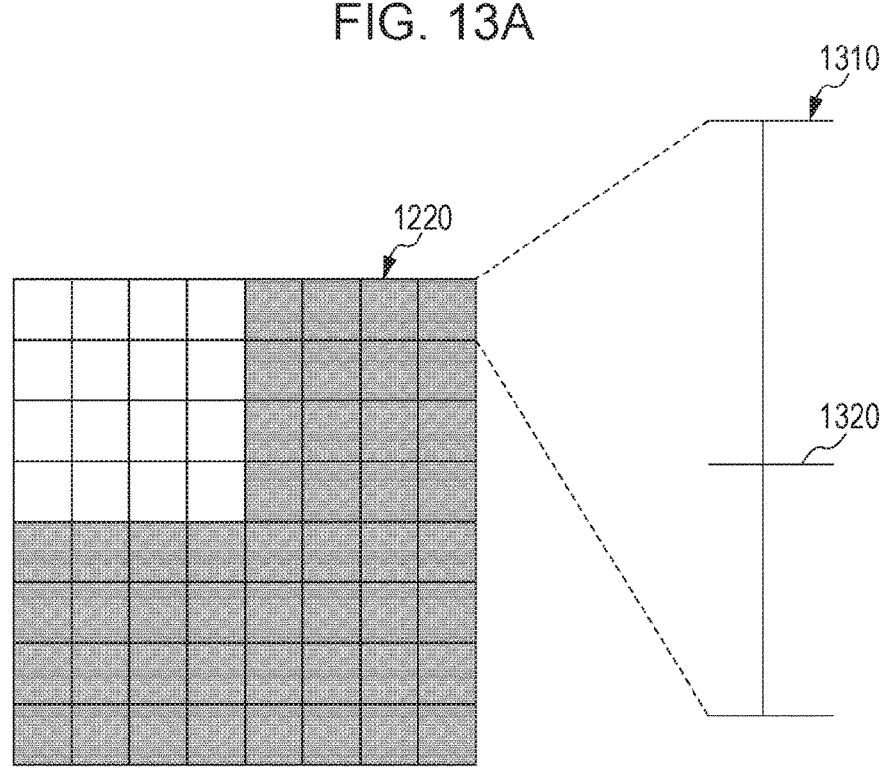
FIGS. 13A and 13B are explanatory diagrams illustrating an example process according to the first exemplary embodiment.
Figure 13B:
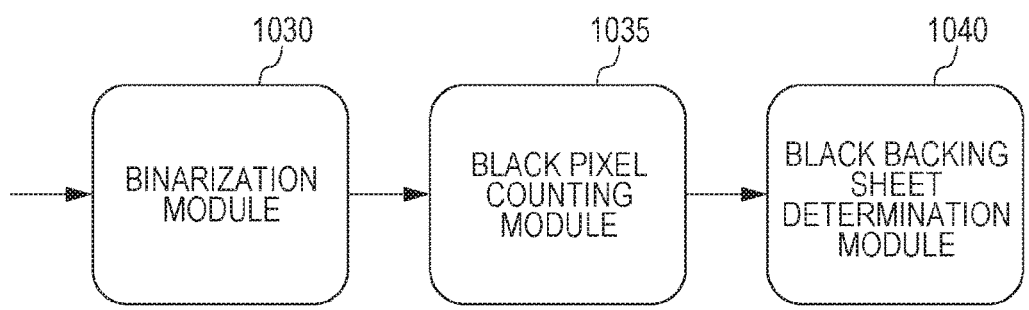

FIG. 11 is a flowchart illustrating an example process according to the first exemplary embodiment.

In step S1102, the number-of-rectangular-shapes determination module 1010 counts the number of received rectangular shapes.

In step S1104, the number-of-rectangular-shapes determination module 1010 determines whether the number of received rectangular shapes is equal to or larger than N. If the number of received rectangular shapes is equal to or larger than N, the flow proceeds to step S1124, otherwise the flow proceeds to step S1106.

In step S1106, the base color reference area selection module 1025 selects a reference area used to determine the base color. An example process performed by the base color reference area selection module 1025 is described with reference to FIGS. 12A to 12C. For example, the resulting reduced cut image 850 illustrated in FIG. 12A is illustrated as a target image 1200 (resulting reduced cut image 850) in FIG. 12B that has a peripheral area along the four edges having a base color determination reference width 1210. The base color determination reference width 1210 is a variable parameter. The base color determination reference width 1210 may be a predetermined value (for example, 5 mm) or may be determined in accordance with the size of an image received by the data read module 110.

A lower right area 1220 of the target image 1200 is as illustrated in FIG. 12C, for example. The area 1220 is an area of 8×8 (64) pixels, which is the reference area.

In the example in FIG. 12C, the number of search-target pixels is expressed as follows.

$$\text{Number of search-target pixels} = 2 \times (H \times \Delta) + 2 \times (W - 2 \times \Delta) \times \Delta = 2\Delta(H+W) - 4\Delta^2$$

Here, H is the height (number of pixels) of the target image 1200, W is the width (number of pixels) of the target image 1200, and Δ may be set as follows, for example.

$$\Delta = 4 \text{[pixels] at 18.75 dpi, 5 mm}$$

In step S1108, the binarization module 1030 performs a binarization process on an image within the reference area. An example process performed by the binarization module 1030, the black pixel counting module 1035, and the black backing sheet determination module 1040 is described with reference to FIGS. 13A and 13B. The binarization module 1030 performs a binarization process by, for example, using a binarization threshold 1320 (which is a predetermined value and is 30, for example) within a binarization scale 1310.

In step S1110, the black pixel counting module 1035 counts black pixels in the reference area after binarization. The number of black pixels is represented by S.

In step S1112, the black backing sheet determination module 1040 determines the result of calculation using a formula for determination. If the result of calculation indicates that the reference area is "likely to be black", the flow proceeds to step S1114. If the result of calculation indicates that the reference area is "not black", the flow proceeds to step S1124. For example, a threshold ratio used to determine that a black backing sheet is used is predetermined (for example, 70% of the number of pixels in the reference area). Then, if the ratio of the number of black pixels to the number of pixels in the reference area is larger than the predetermined threshold, it is determined that a black backing sheet is used. Specifically, the following formula for determination is used, and it is determined that a black backing sheet is used if the following formula is satisfied.

$$S/[2\Delta(H+W)-4\Delta^2] > 0.7$$

In step S1114, the size determination module 1050 measures the size of the rectangular shape.

In step S1116, the size determination module 1050 determines whether the size of the rectangular shape is equal to or smaller than a predetermined size. If the size of the rectangular shape is equal to or smaller than the predetermined size, the flow proceeds to step S1124, otherwise the flow proceeds to step S1118.

In step S1118, the number of rectangular shapes B included in the rectangular shape is counted.

In step S1120, it is determined whether the number of rectangular shapes B is smaller than a predetermined number. If the number of rectangular shapes B is smaller than the predetermined number, the flow proceeds to step S1124, otherwise the flow proceeds to step S1122.

In step S1122, it is determined that "a black backing sheet is used".

In step S1124, it is determined that "a black backing sheet is not used".

Regarding the order of the processes in the example flowchart illustrated in FIG. 11, any of the four processes, namely, a process A, which is the process from step S1102 to step S1104, a process B, which is the process from step S1106 to step S1112, a process C, which is the process from step S1114 to step S1116, and a process D, which is the process from step S1118 to step S1120, may be performed first, or the four process may be performed in parallel. If the process A is performed first, the process itself is simple, and in a case where a white backing sheet is used and plural document images are present, other processes need not be performed, which contributes to accelerated processing.

Alternatively, all of the four processes may be performed, and determination as to whether a black backing sheet is used is performed in accordance with the results of the respective processes on the basis of a majority rule. Accordingly, it is possible to precisely perform determination as to whether a black backing sheet is used.

Alternatively, the process B may be repeatedly performed. That is, in the case where it is determined that the reference area is "not black" in step S1112, the width of the reference area (Δ described above) may be increased, and the process from step S1106 may be performed. In a case where a black backing sheet is used but a document is present in an edge portion of the black backing sheet (within the reference area), it may be determined that the reference area is "not black". Accordingly, the width of the reference area is increased to respond to such a case. Note that the number of repetitions of the process B may be a predetermined number of times. Alternatively, the process B may be terminated if the width of the reference area becomes equal to or larger than a predetermined value.

Second Exemplary Embodiment

Figure 15:
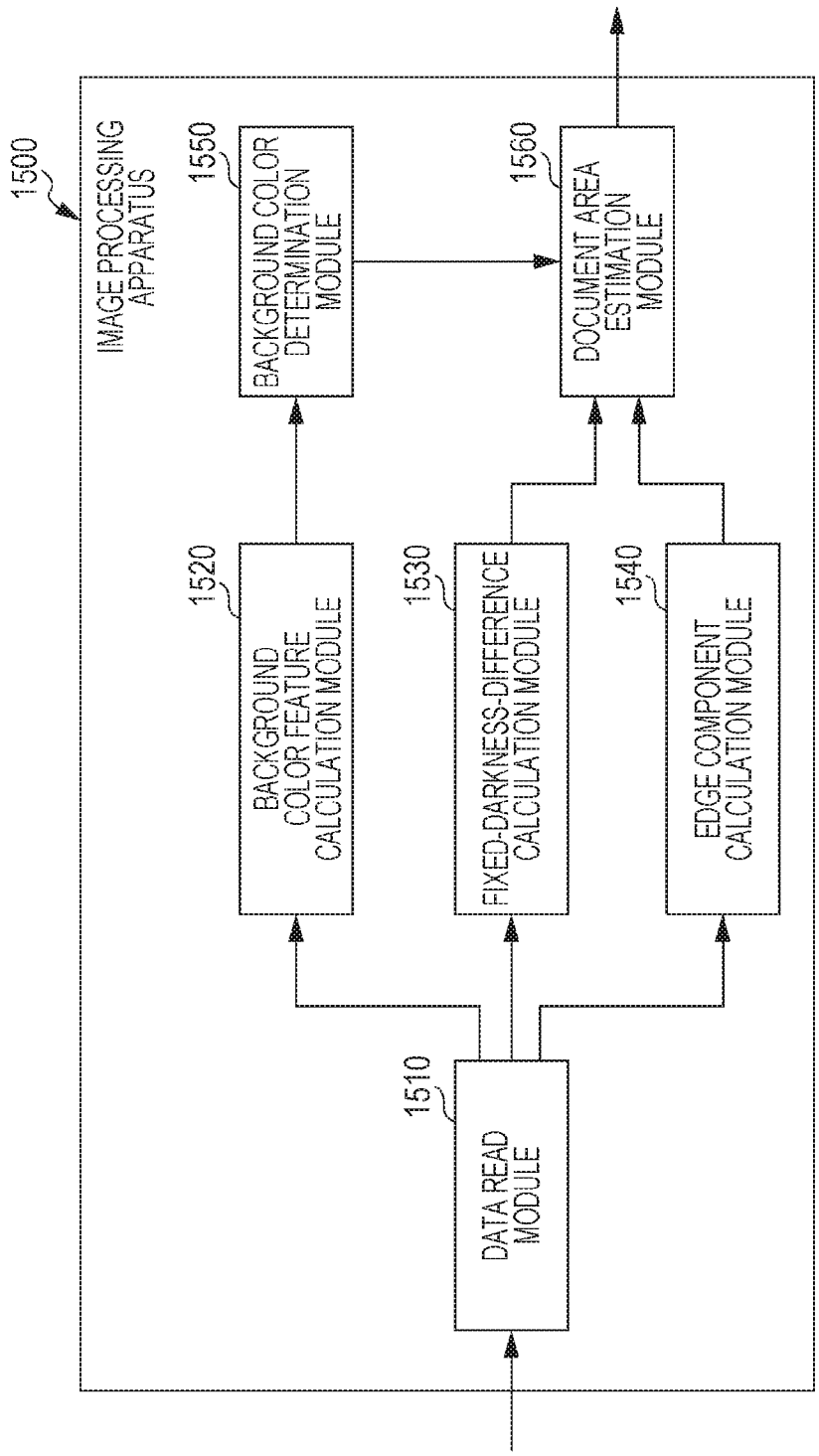
FIG. 15 is a block diagram schematically illustrating an example module configuration according to a second exemplary embodiment.

The image processing apparatus 1500 of the second exemplary embodiment extracts, from an image including plural document images, the document images. The image processing apparatus 1500 includes a data read module 1510, a background color feature calculation module 1520, the fixed-darkness-difference calculation module 1530, the edge component calculation module 1540, a background color determination module 1550, and a document area estimation module 1560, as illustrated in the example in FIG. 15. The document images mentioned here are business cards or receipts, for example, as in the first exemplary embodiment, and an image obtained by reading plural documents in a single scan process is a target image.

In order to increase the precision of extraction of document images, a black backing sheet, for example, is typically used to create a black background as in the first exemplary embodiment.

However, it is difficult to detect a document in a color close to the color of the black backing sheet. A specially designed business card may be filled with a color close to black, for example.

Further, an operator is not necessarily use a black sheet and may have plural documents read while using a white background.

The data read module 1510 is connected to the background color feature calculation module 1520, the fixed-darkness-difference calculation module 1530, and the edge component calculation module 1540. The data read module 1510 receives an image that includes plural document images. Receiving an image is reading an image by using, for example, a scanner or a camera, receiving an image from an external device via a communication line by using, for example, a facsimile machine, or reading an image stored in, for example, a hard disk (a hard disk that is built in the image processing apparatus 1500 or a hard disk connected to the image processing apparatus 1500 over a network), for example. The image is a multi-value image (may be a color image).

In a case where a document is read, the document may be read by using a backing sheet in a color other than white (for example, a dark color with low brightness, such as black, dark blue, or dark gray, or a color, such as a metallic color, having varying reflection properties for read light, which is hereinafter referred to as "black" in this exemplary embodiment) or may be read by using a white backing sheet. The color of the backing sheet is the background color of the image. A document may be read without using a backing sheet. In this case, the color of the back side of the platen cover (for example, white) is the background color of the image. A predetermined backing sheet (which is an accessory, for example, of a product in which the image processing apparatus 1500 is built) may be used, or a backing sheet provided by the operator may be used. Alternatively, a copy may be made with the platen cover being left open, for example, to create a black sheet.

Note that the operator may be recommended to use a black backing sheet when they have plural documents read. In a case where an instruction for "having plural documents read" is provided, for example, use of a black backing sheet may be suggested on a display. However, the operator does not necessarily use a black backing sheet in accordance with the suggestion.

The background color feature calculation module 1520 is connected to the data read module 1510 and the background color determination module 1550. The background color feature calculation module 1520 checks a predetermined area in the image received by the data read module 1510 and extracts a feature value from the distribution of the brightness values of pixels in the predetermined area. The "predetermined area" is, for example, a peripheral area of the image (in a case where the image has a rectangular shape (rectangle or square shape), an area along the four edges) because a document is less likely to be present in the area. Further, plural areas are set in a single image, the results of estimation of the background color based on the respective areas are collected, and the background color determination module 1550 finally determines the background color. The details are described below with reference to the example in FIGS. 20A to 20C4. As a result, unlike a special folder in which business cards, for example, are set as described in Japanese Patent No. 4795038, for example, it is not necessary to provide, at a fixed place of the special folder, an area used to determine whether a black sheet is used. That is, a special folder, for example, is not necessary in this exemplary embodiment, and a sheet of a dark color prepared by a user (for example, a black sheet created by making a copy with the platen cover being left open as described above) may be used.

The fixed-darkness-difference calculation module 1530 is connected to the data read module 1510 and the document area estimation module 1560. The fixed-darkness-difference calculation module 1530 extracts a first area having low-frequency characteristics in the image received by the data read module 1510. The fixed-darkness-difference calculation module 1530 may extract the first area by performing, for example, a binarization process. The binarization process may be a simple binarization process, for example, in which labeling is performed in accordance with a comparison with a threshold.

The fixed-darkness-difference calculation module 1530 may determine the threshold by using the result of processing by the background color feature calculation module 1520. For example, if the threshold for the simple binarization is determined from the average color, a backing sheet other than a black sheet may be used.

The edge component calculation module 1540 is connected to the data read module 1510 and the document area estimation module 1560. The edge component calculation module 1540 extracts a second area having high-frequency characteristics in the image received by the data read module 1510. The edge component calculation module 1540 may extract the second area by performing an edge detection process or a color difference detection process. In the edge detection process, the Sobel filter or the Canny edge filter, for example, may be used. In the color difference detection process, color difference signals (for example, R-Y and B-Y) may be used.

The background color determination module 1550 is connected to the background color feature calculation module 1520 and the document area estimation module 1560. The background color determination module 1550 determines whether the background is white on the basis of a feature value extracted by the background color feature calculation module 1520. For example, the background color determination module 1550 determines whether the background is white on the basis of the brightness values of pixels in the peripheral area of the image. More specifically, the background color determination module 1550 may determine whether the background of the image is white by using the result of determination as to whether each of the four peripheral areas is white.

The document area estimation module 1560 is connected to the fixed-darkness-difference calculation module 1530, the edge component calculation module 1540, and the background color determination module 1550. The document area estimation module 1560 extracts the area of a document image by combining the first area and the second area in accordance with whether the background of the image is white (the result of determination by the background color determination module 1550). For example, the document area estimation module 1560 extracts the area of a document image by combining the first area and the second area in a ratio determined in accordance with whether the background of the image is white.

Here, the ratio in which the first area and the second area are combined may be a ratio of 1 to 1, for example, in which the areas are equally used or a ratio of 7 to 3, for example, in which one of the areas is used preferentially over the other. Alternatively, only one of the areas may be used. In the case where only one of the areas is used, namely, in a case where only the second area is used, for example, the second area is the area of a document image.

In the case where the background of the image is not white, the document area estimation module 1560 may extract the area of a document image by using both the first area and the second area. In the case where the background of the image is white, the document area estimation module 1560 may extract the area of a document image by preferentially using the second area. Here, "preferentially using" also means extracting the area of a document image by using only the second area without using the first area. That is, the second area is synonymous with the area of a document image.

The document area estimation module 1560 generates the process result table 1400, for example, as a result of processing. Then, the document area estimation module 1560 outputs the image and the process result table 1400 or extracts document images from the image by referring to the process result table 1400 and outputs the document images. Outputting the extracted document images is printing the document images by using a printer, displaying the document images on a display, transmitting the document images by using an image transmission apparatus, such as a facsimile machine, writing the document images to an image storage device, such as an image database, storing the document images in a storage medium, such as a memory card, or passing the document images to another information processing apparatus (for example, the document processing apparatus 250 described above), for example.

FIGS. 16A1 to 16B2 are explanatory diagrams illustrating example processes for extracting document images without employing the second exemplary embodiment (by using the related art). Here, example processes performed in a case of a black background are illustrated.

One of the example processes is an example process in which a simple binarization process is performed on an image 1600*a* illustrated in the example in FIG. 16A1, and a process result image 1605*a* illustrated in the example in FIG. 16A2 is obtained. The image 1600*a* is an image obtained by reading six business cards using a black backing sheet.

In the image 1600*a*, a business-card image 1610*a*, a business-card image 1620*a*, a business-card image 1630*a*, a business-card image 1640*a*, a business-card image 1650*a*, and a business-card image 1660*a* are arranged. The business-card image 1610*a* and the other business-card images are mostly white, and therefore, a business-card image area 1615*a*, a business-card image area 1625*a*, a business-card image area 1635*a*, a business-card image area 1645*a*, a business-card image area 1655*a*, and a business-card image area 1665*a* are successfully extracted from the process result image 1605*a* as a result of a simple binarization process. That is, the business-card image area 1615*a* and the other business-card image areas, which correspond to white documents, are successfully and correctly extracted as foreground images. In FIG. 16A2, the results of extraction are illustrated in black.

The other example process is an example process in which a simple binarization process is performed on an image 1600*b* illustrated in the example in FIG. 16B1, and a process result image 1605*b* illustrated in the example in FIG. 16B2 is obtained. The image 1600*b* is an image obtained by reading six business cards using a black backing sheet. Some of the business-card images are images of specially designed business cards. For example, a business-card image 1610*b* is formed of a white area image 1612*b* and a blue area image 1614*b*. A business-card image 1620*b* is formed of a white area image 1622*b* and a blue area image 1624*b*. A business-card image 1660*b* is formed of a blue area image 1664*b*.

In the image 1600*b*, the business-card image 1610*b*, the business-card image 1620*b*, a business-card image 1630*b*, a business-card image 1640*b*, a business-card image 1650*b*, and the business-card image 1660*b* are arranged. The business-card image 1610*b*, for example, includes the blue area image 1614*b* in a color close to the color of the backing sheet, namely, black, and therefore, only a business-card image area 1615*b* is extracted in a simple binarization process, and the area corresponding to the blue area image 1614*b* is not extracted. That is, the business-card image area 1615*b*, a business-card image area 1625*b*, a business-card image area 1635*b*, a business-card image area 1645*b*, and a business-card image area 1655*b* are extracted from the process result image 1605*b*. That is, regarding the business-card image 1610*b*, only the portion corresponding to the white area image 1612*b* is detected and the portion corresponding to the blue area image 1614*b* is not detected. Regarding the business-card image 1620*b*, only the portion corresponding to the white area image 1622*b* is detected and the portion corresponding to the blue area image 1624*b* is not detected. Further, the business-card image 1660*b* is not detected. That is, a dark portion (the blue area image 1614*b*, for example) is processed as the background in a simple binarization process, and therefore, required detection of the document images fails.

Figure 17:
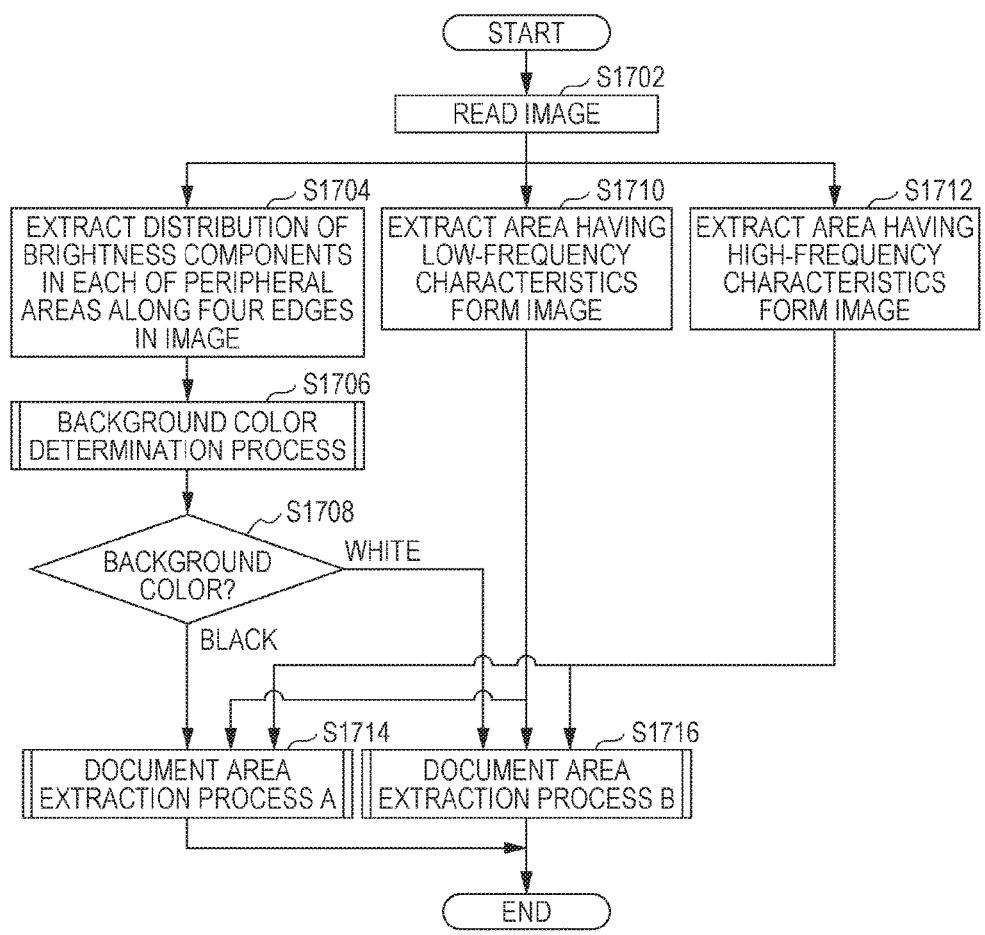
FIG. 17 is a flowchart illustrating an example process according to the second exemplary embodiment.

FIG. 17 is a flowchart illustrating an example process according to the second exemplary embodiment.

In step S1702, the data read module 1510 reads an image, and the flow proceeds to step S1704, step S1710, and step S1712.

In step S1704, the background color feature calculation module 1520 extracts the distribution of the brightness components of pixels in each of the peripheral areas along the four edges in the image.

In step S1706, the background color determination module 1550 performs a background color determination process. The details of the process in step S1706 are described below with reference to the example flowchart illustrated in FIG. 18 or FIG. 19.

In step S1708, the background color determination module 1550 determines the background color. If the background color is black, the flow proceeds to step S1714. If the background color is white, the flow proceeds to step S1716.

In step S1710, the fixed-darkness-difference calculation module 1530 extracts an area having low-frequency characteristics form the image, and the flow proceeds to step S1714 and step S1716.

In step S1712, the edge component calculation module 1540 extracts an area having high-frequency characteristics from the image, and the flow proceeds to step S1714 and step S1716.

In step S1714, the document area estimation module 1560 performs a document area extraction process A. The details of the process in step S1714 are described below with reference to the example flowchart illustrated in FIG. 22.

In step S1716, the document area estimation module 1560 performs a document area extraction process B. The details of the process in step S1716 are described below with reference to the example flowchart illustrated in FIG. 24.

Note that the process in step S1704, that in step S1710, and that in step S1712 may be performed in parallel or may be sequentially performed. The process in step S1710 and that in step S1712 may be performed after the determination process in step S1708 (before step S1714 and step S1716). Further, if it is determined that the background is white in step S1708, only the process in step S1712 may be performed (and the process in step S1710 need not be performed).

Figure 18:
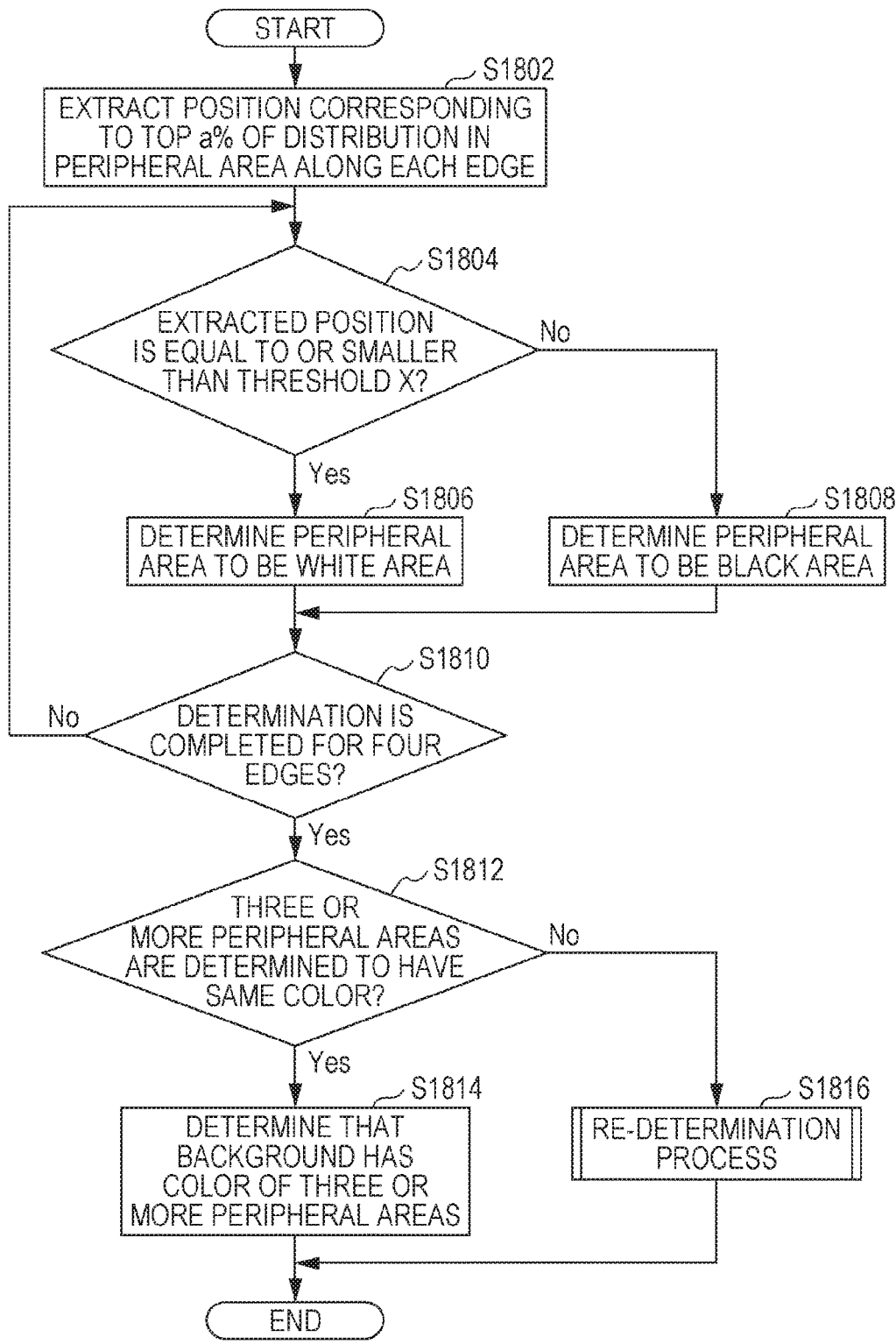
FIG. 18 is a flowchart illustrating an example process according to the second exemplary embodiment.

FIG. 18 is a flowchart illustrating an example process according to the second exemplary embodiment. The example process is an example of the process in step S1706, which is described below with reference to the example illustrated in FIGS. 20A to 20C4.

In step S1802, the position (brightness value) corresponding to the top a % of the distribution of the brightness values of pixels in the peripheral area along each edge is extracted. For example, an image 2000 illustrated in FIG. 20A is assumed to be a target. The image 2000 includes plural business-card images. The distribution of the brightness values of pixels in each of the areas along the four edges of the image 2000, namely, an upper edge area 2010, a right edge area 2020, a lower edge area 2030, and a left edge area 2040 illustrated in the example in FIG. 20B, is determined. Specifically, the number of pixels corresponding to each brightness value (each value between 0 and 255 in the examples in FIGS. 20C1 to 20C4) is counted. In the example graphs illustrated in FIGS. 20C1 to 20C4, the horizontal axis represents the brightness value, where the left end corresponds to 0 (white) and the right end corresponds to 255 (black), and the vertical axis represents the number of pixels corresponding to each brightness value. The graph in FIG. 20C1 represents the distribution of the brightness values of pixels in the upper edge area 2010. The graph in FIG. 20C2 represents the distribution of the brightness values of pixels in the right edge area 2020. The graph in FIG. 20C3 represents the distribution of the brightness values of pixels in the lower edge area 2030. The graph in FIG. 20C4 represents the distribution of the brightness values of pixels in the left edge area 2040. In FIGS. 20C1 to 20C4, the top 5% is assumed to be the "top a %". Here, "top" refers to a group of pixels having a brightness value close to 255. A state where the position of the "top a %" is low (close to zero) means that the number of black pixels is small (the number of white pixels is large). In the graph in FIG. 20C1, the position is at "11". In the graph in FIG. 20C2, the position is at "12". In the graph in FIG. 20C3, the position is at "70". In the graph in FIG. 20C4, the position is at "15".

In step S1804, it is determined whether the extracted position is equal to or smaller than a threshold X. If the extracted position is equal to or smaller than the threshold X, the flow proceeds to step S1806, otherwise the flow proceeds to step S1808. For example, the "threshold X" is set to 60 in FIGS. 20C1 to 20C4. Therefore, in the determination process in step S1804, the result of determination is "Yes" for the graph in FIG. 20C1, "Yes" for the graph in FIG. 20C2, "No" for the graph in FIG. 20C3, and "Yes" for the graph in FIG. 20C4. That is, among the four peripheral areas, three peripheral areas are determined to be white areas and one peripheral area is determined to be an area that is not a white area.

In step S1806, the peripheral area is determined to be a white area.

In step S1808, the peripheral area is determined to be a black area. As a matter of course, black is an example of a color that is not white.

In step S1810, it is determined whether determination is completed for all of the four edges. If determination is completed for all of the four edges, the flow proceeds to step S1812, otherwise the flow returns to step S1804.

In step S1812, it is determined whether three or more peripheral areas are determined to have the same color. If three or more peripheral areas are determined to have the same color, the flow proceeds to step S1814, otherwise the flow proceeds to step S1816.

In step S1814, it is determined that the background has the color of the three or more peripheral areas. In the example in FIGS. 20C1 to 20C4, three peripheral areas are determined to be white areas, and therefore, the background of the image 2000 is determined to be white. As a matter of course, if three peripheral areas are determined to be black areas, the background of the image 2000 is determined to be black.

In step S1816, a re-determination process is performed. The details of the process in step S1816 are described below with reference to the example flowchart illustrated in FIG. 21.

Figure 19:
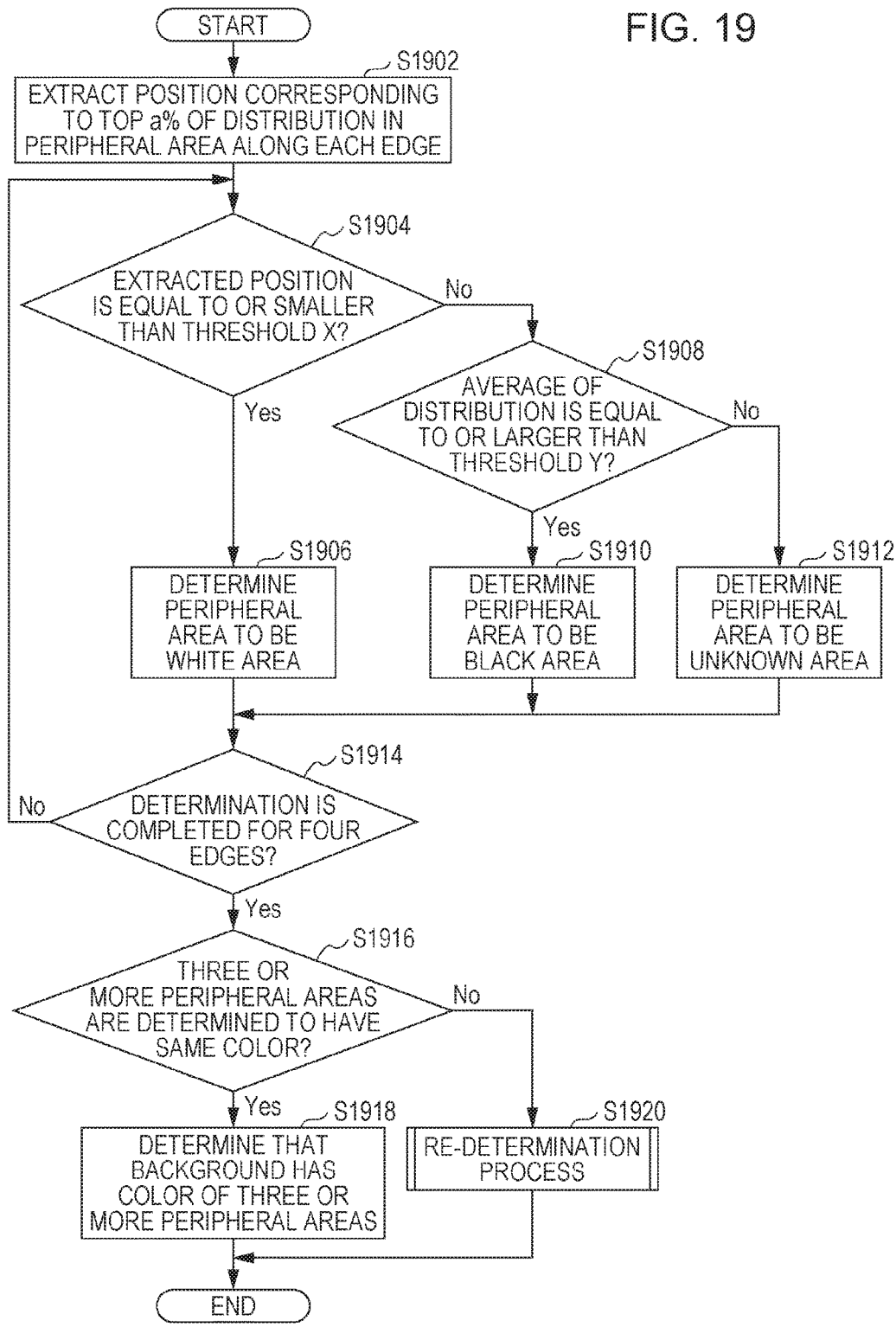
FIG. 19 is a flowchart illustrating an example process according to the second exemplary embodiment.

FIG. 19 is a flowchart illustrating an example process according to the second exemplary embodiment. The example process is an example of the process in step S1706. In the example flowchart illustrated in FIG. 18, the peripheral area is determined to be black if the peripheral area is not white; however, a determination process (in step S1908) for determining whether the peripheral area is a black area is added in FIG. 19. The processes other than the process in step S1908 and that in step S1912 are the same as those illustrated in the example in FIG. 18.

In step S1902, the position corresponding to the top a % of the distribution of the brightness values of pixels in the peripheral area along each edge is extracted.

In step S1904, it is determined whether the extracted position is equal to or smaller than the threshold X. If the extracted position is equal to or smaller than the threshold X, the flow proceeds to step S1906, otherwise the flow proceeds to step S1908.

In step S1906, the peripheral area is determined to be a white area.

In step S1908, it is determined whether the average of the distribution of the brightness values is equal to or larger than a threshold Y. If the average is equal to or larger than the threshold Y, the flow proceeds to step S1910, otherwise the flow proceeds to step S1912. Accordingly, determination as to whether the peripheral area is a white area is performed separately from determination as to whether the peripheral area is a black area. For example, determination as to whether the peripheral area is a white area may be performed with high precision, and determination as to whether the peripheral area is a black area may be performed with low precision. Specifically, in step S1908, the "threshold Y" may be set to 128 or higher. The criterion for determination based on this value is not as strict as a criterion defined by applying a condition that the position corresponding to the bottom 5% of the distribution of the brightness values is equal to or larger than a threshold 195 (which is a criterion for determination defined by flipping the condition that "the position corresponding to the top 5% is equal to or smaller than the threshold 60" applied in step S1904 and applying the flipped condition as is as a criterion for determining a black region).

In step S1910, the peripheral area is determined to be a black area, and the flow proceeds to step S1914.

In step S1912, the peripheral area is determined to be an unknown area, and the flow proceeds to step S1914.

In step S1914, it is determined whether determination is completed for all of the four edges. If determination is completed for all of the four edges, the flow proceeds to step S1916, otherwise the flow returns to step S1904.

In step S1916, it is determined whether three or more peripheral areas are determined to have the same color. If three or more peripheral areas are determined to have the same color, the flow proceeds to step S1918, otherwise the flow proceeds to step S1920.

In step S1918, it is determined that the background has the color of the three or more peripheral areas.

In step S1920, a re-determination process is performed. The details of the process in step S1920 are described below with reference to the example flowchart illustrated in FIG. 21.

FIG. 21 is a flowchart illustrating an example process according to the second exemplary embodiment. The example process is an example of the process in step S1816 and step S1920.

In step S2102, it is determined whether the number of white areas is larger than the number of black areas. If the number of white areas is larger than the number of black areas, the flow proceeds to step S2104, otherwise the flow proceeds to step S2106.

In step S2104, it is determined that the background is a white background, and the flow ends (step S2199).

In step S2106, it is determined whether the number of black areas is larger than the number of white areas. If the number of black areas is larger than the number of white areas, the flow proceeds to step S2108, otherwise (that is, if it is not possible to determine whether the background is white), the flow proceeds to step S2110.

In step S2108, it is determined that the background is a black background, and the flow ends (step S2199).

In step S2110, an inquiry is made to the user. For example, display is performed to prompt the user to specify whether the background is white or a color other than white. Alternatively, display is performed to prompt the user to provide an instruction for a re-scan. Specifically, display is performed to ask the user whether the user has used a white backing sheet, the user has used a black backing sheet, or the user will provide an instruction for performing re-reading (re-scan) (three buttons indicating "white", "black" and "re-reading" are displayed) to prompt the user to provide an answer. In the case of "display is performed to prompt the user to provide an instruction for a re-scan", display may be further performed to suggest that the user use a black backing sheet and place a document close to the center of the backing sheet, for example.

In step S2112, the answer is determined. If the answer is "white", the flow proceeds to step S2114. If the answer is "black", the flow proceeds to step S2116. If the answer is "re-reading", the flow proceeds to step S2118.

In step S2114, it is determined that the background is a white background.

In step S2116, it is determined that the background is a black background.

In step S2118, advice is displayed to suggest that a document be placed close to the center to perform a re-scan.

Figure 22:
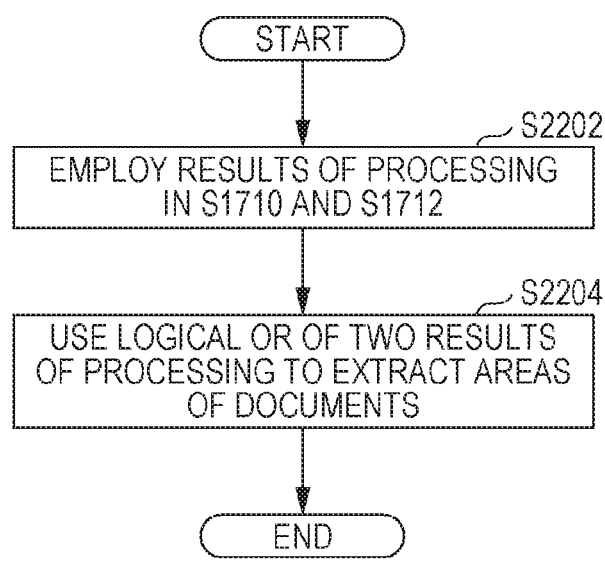
FIG. 22 is a flowchart illustrating an example process according to the second exemplary embodiment.

FIG. 22 is a flowchart illustrating an example process according to the second exemplary embodiment. The example process is an example of the process in step S1714.

In step S2202, the result of processing in step S1710 and that in step S1712 are employed.

In step S2204, the logical OR of the two results of processing is used to extract the areas of documents.

Figure 23:
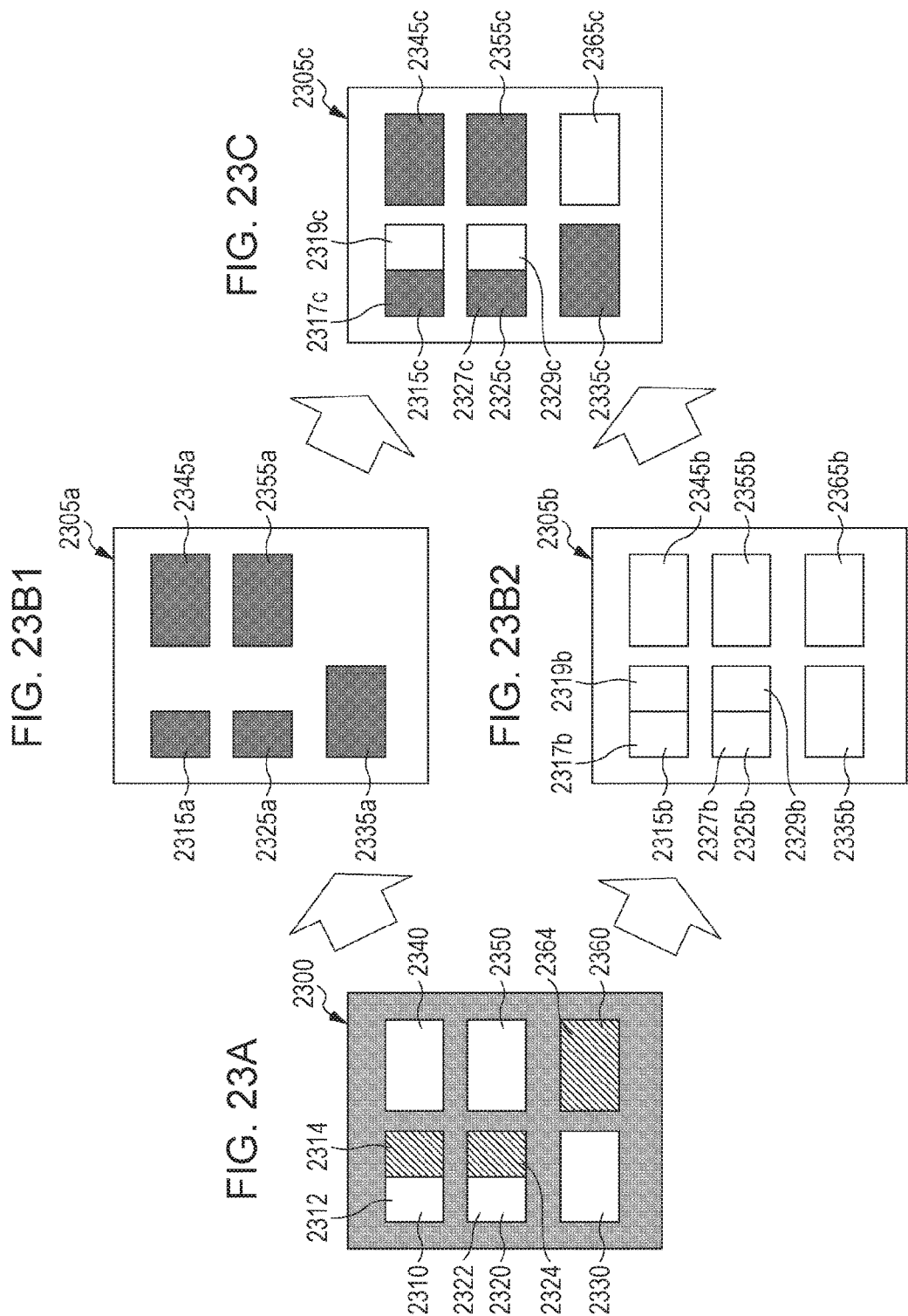
FIGS. 23A to 23C are explanatory diagrams illustrating an example process according to the second exemplary embodiment.

FIGS. 23A to 23C are explanatory diagrams illustrating the example process illustrated by the flowchart in FIG. 22.

An image 2300 illustrated in the example in FIG. 23A is assumed to be a target. The image 2300 is an image obtained by reading six business cards using a black backing sheet and is identical to the image 1600b illustrated in the example in FIG. 16B1.

A process result image 2305a illustrated in the example in FIG. 23B1 is an image obtained by performing simple binarization on the image 2300.

A process result image 2305b illustrated in the example in FIG. 23B2 is an image obtained by performing edge detection on the image 2300. With the edge detection, the edges of dark portions (a blue area image 2314, a blue area image 2324, and a blue area image 2364), which are unable to be extracted in simple binarization, are successfully extracted.

A process result image 2305c illustrated in the example in FIG. 23C is obtained by performing a logical OR process on the process result image 2305a and the process result image 2305b. With the process, the edges of the dark portions (the blue area image 2314, the blue area image 2324, and the blue area image 2364) are successfully extracted, and therefore, areas (a business-card edge 2315b, a business-card edge 2325b, and a business-card edge 2365b) are successfully detected.

In the example process, the logical OR of the two results of processing are used, that is, the two results of processing are used in a ratio of 1 to 1. However, one of the results of processing may be reflected to a larger degree. For example, the second area (the result of processing by the edge component calculation module 1540) may be preferentially used. For example, the reflection ratio between the two results of processing may be adjusted depending on whether the background is determined in step S1814 (step S1918) or the background is determined in step S1816 (step S1920). Specifically, in the case where the background is determined in step S1814 (step S1918), the two results of processing may be used in a ratio of 1 to 1. In the case where the background is determined in step S1816 (step S1920), the result of processing by the edge component calculation module 1540 may be preferentially used. This is because, in the case where the background is determined in step S1816 (step S1920), the background may be erroneously determined to be black unlike in the case where the background is determined in step S1814 (step S1918).

In the process result image 2305b, a line detected as an edge may be broken, and therefore, the process result image 2305a is used to compensate for the break. In a case where the backing sheet has creases, the process result image 2305b may include lines produced by detecting the creases as edges. When a union operation is performed on the process result image 2305b and the process result image 2305a, it is possible to determine that an edge detected from a crease is not a line that defines a rectangular shape area.

Figure 24:
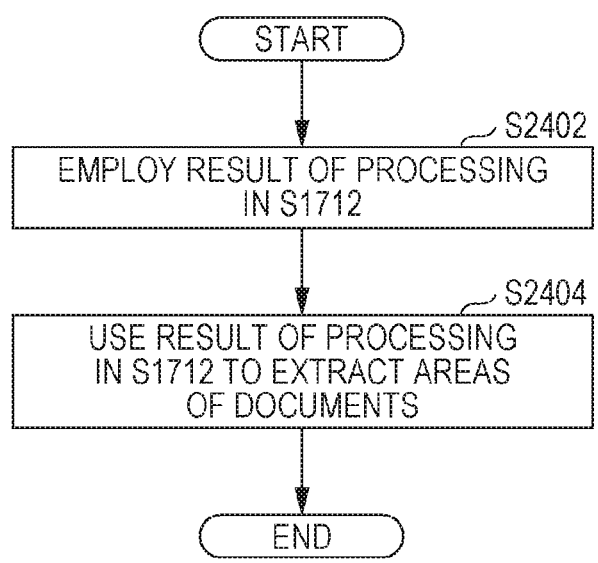
FIG. 24 is a flowchart illustrating an example process according to the second exemplary embodiment.

FIG. 24 is a flowchart illustrating an example process according to the second exemplary embodiment. The example process is an example of the process in step S1716.

In step S2402, the result of processing in step S1712 is employed.

In step S2404, the result of processing in step S1712 is used to extract the areas of documents.

FIGS. 25A to 25C are explanatory diagrams illustrating the example process illustrated by the flowchart in FIG. 24.

An image 2500 illustrated in the example in FIG. 25A is assumed to be a target. The image 2500 is an image obtained by reading six business cards using a white backing sheet. The business cards are identical to business cards corresponding to the business-card image 1610b and the other business-card images illustrated in the example in FIG. 16B1.

A process result image 2505a illustrated in the example in FIG. 25B1 is an image obtained by performing simple binarization on the image 2500. With the simple binarization, dark portions (a blue area image 2514, a blue area image 2524, and a blue area image 2564) are successfully extracted; however, a white area image 2512 in a business-card image 2510, a white area image 2522 in a business-card image 2520, a business-card image 2530, a business-card image 2540, and a business-card image 2550 are unable to be extracted.

A process result image 2505b illustrated in the example in FIG. 25B2 is an image obtained by performing edge detection on the image 2500. With the edge detection, the white portions (the white area image 2512 in the business-card image 2510, the white area image 2522 in the business-card image 2520, the business-card image 2530, the business-card image 2540, and the business-card image 2550), which are unable to be extracted in simple binarization, are successfully extracted.

The process result image 2505b is employed as is as a process result image 2505c illustrated in the example in FIG. 25C. With the process, the edges of the white portions are successfully detected as described above.

Note that, in a case where the background is determined to be white as a result of processing by the background color determination module 1550, processing by the fixed-darkness-difference calculation module 1530 need not be performed.

An example hardware configuration of the image processing apparatuses according to the exemplary embodiments of the present invention is described with reference to FIG. 26. The configuration illustrated in FIG. 26 is set up by using a personal computer (PC), for example. FIG. 26 illustrates an example hardware configuration including a data read unit 2617, such as a scanner, and a data output unit 2618, such as a printer.

A CPU 2601 is a controller that performs processes in accordance with a computer program that describes sequences to be performed by the modules described in the above-described exemplary embodiments. The modules include the data read module 110, the rectangular shape detection module 120, the condition determination module 130, the included-rectangular-shape detection module 140, the image reduction module 510, the rectangular shape detection processing module 520, the coordinate restoration module 530, the rectangular-shape-cutting and inclination-correction module 540, the rectangular-shape-cutting and inclination-correction module 550, the black-backing-sheet rectangular shape detection processing module 580, the rectangular-shape-cutting and inclination-correction module 590, the number-of-rectangular-shapes determination module 1010, the background state determination processing module 1020, the base color reference area selection module 1025, the binarization module 1030, the black pixel counting module 1035, the black backing sheet determination module 1040, the size determination module 1050, the data read module 1510, the background color feature calculation module 1520, the fixed-darkness-difference calculation module 1530, the edge component calculation module 1540, the background color determination module 1550, and the document area estimation module 1560.

A read-only memory (ROM) 2602 stores the program and operation parameters, for example, used by the CPU 2601. A RAM 2603 stores the program when the program is executed by the CPU 2601 and parameters that vary as appropriate in the execution. The CPU 2601, the ROM 2602, and the RAM 2603 are connected to one another via a host bus 2604, which is constituted by a CPU bus and so on.

The host bus 2604 is connected to an external bus 2606, such as a peripheral component interconnect/interface (PCI) bus, via a bridge 2605.

A keyboard 2608 and a pointing device 2609, such as a mouse, are devices operated by an operator. A display 2610 is a liquid crystal display or a cathode ray tube (CRT) display, for example, and displays various types of information as text or image information. A touch screen having the functions of both the pointing device 2609 and the display 2610 may be provided.

A hard disk drive (HDD) 2611 includes a hard disk (or a flash memory, for example), drives the hard disk, and records or reproduces the program executed by the CPU 2601 and information. In the hard disk, a target image, the process result table 1400, document images, and the result of processing by each module, for example, are stored. Other data and various computer programs, for example, are also stored in the hard disk.

A drive 2612 reads data or a program recorded to a removable recording medium 2613, such as a magnetic disk, an optical disk, a magneto-optical (MO) disk, or a semiconductor memory, when the removable recording medium 2613 is mounted, and feeds the data or program to the RAM 2603, which is connected via an interface 2607, the external bus 2606, the bridge 2605, and the host bus 2604. Note that the removable recording medium 2613 is also usable as a data recording area.

A connection port 2614 is a port for making a connection with an external connection device 2615 and has a USB connection portion, an IEEE 1394 connection portion, and so on. The connection port 2614 is connected to the CPU 2601 and so on via the interface 2607, the external bus 2606, the bridge 2605, and the host bus 2604, for example. A communication unit 2616 is connected to a communication line and performs an external data communication process. The data read unit 2617 is, for example, a scanner and performs a process for reading a document. The data output unit 2618 is, for example, a printer and performs a process for outputting document data.

Note that the hardware configuration of the image processing apparatus illustrated in FIG. 26 is one example configuration. The exemplary embodiments of the present invention need not restrictively employ the configuration illustrated in FIG. 26 and may employ a configuration that enables implementation of the modules described in the exemplary embodiments of the present invention. For example, some of the modules may be configured by using a dedicated hardware unit (for example, an application-specific integrated circuit (ASIC)), or some of the modules may reside in an external system and may be connected via a communication line. Alternatively, the system illustrated in FIG. 26 may be provided in plurality, and the plural systems may be connected to one another via communication lines and operate cooperatively with one another. Specifically, the system may be built in a PC, a portable information communication device (a portable phone, a smartphone, a mobile device, a wearable computer, or the like), a home information appliance, a robot, a copy machine, a facsimile machine, a scanner, a printer, a multifunction machine (an image processing apparatus having two or more functions among the functions provided by a scanner, a printer, a copy machine, a facsimile machine, and so on), or the like.

The phrases "equal to or larger than", "equal to or smaller than", "larger than", and "smaller than" used in the description of a comparison process in the above-described exemplary embodiments may be respectively replaced by "larger than", "smaller than", "equal to or larger than", and "equal to or smaller than" as long as the combination produces no contradiction.

The program described above may be stored in a recording medium and provided from the recording medium, or may be provided via a communication system. In this case, the program described above may be regarded as a "computer-readable recording medium storing the program".

The "computer-readable recording medium storing the program" is a computer-readable recording medium that is used to install, execute, and distribute the program, for example, and that records the program thereto.

Examples of the recording medium include a digital versatile disk (DVD) that is based on the standards developed by DVD Forum, such as a DVD–R, a DVD–RW, or a DVD–RAM, a DVD that is based on the standards developed by DVD+RW Alliance, such as a DVD+R or a DVD+RW, a compact disc (CD), such as a compact disc read-only memory (CD-ROM), a CD-Recordable (CD-R), or a CD- Rewritable (CD-RW), a Blu-ray (registered trademark) disc, an MO disk, a flexible disk (FD), a magnetic tape, a hard disk, a ROM, an electrically erasable, programmable read-only memory (EEPROM (registered trademark)), a flash memory, a RAM, a Secure Digital (SD) memory card, and so on.

All or part of the above-described program may be recorded to the recording medium for storage or distribution, for example. All or part of the above-described program may be transmitted through communication via a wired network or a wireless communication network used for a local area network (LAN), a metropolitan area network (MAN), a wide area network (WAN), the Internet, an intranet, an extranet, and so on or via a transmission medium that is a combination thereof, or may be superimposed on a carrier wave and carried.

The above-described program may constitute all or part of another program or may be recorded to a recording medium together with another program. The above-described program may be divided into pieces, which are recorded to plural recording media. The above-described program may be recorded in any form as long as the program is restorable. For example, the program may be compressed or encrypted, and recorded.

The above-described exemplary embodiments (specifically, the second exemplary embodiment) may be construed as follows. Specifically, the second exemplary embodiment may be combined with the first exemplary embodiment, or any module in the first exemplary embodiment may be implemented as a module in the second exemplary embodiment.

[A1] An image processing apparatus including:
a first extraction unit that extracts a first area in an image that includes plural document images, the first area having low-frequency characteristics;
a second extraction unit that extracts a second area in the image, the second area having high-frequency characteristics; and
a third extraction unit that extracts areas of the document images by combining the first area and the second area in accordance with whether a background of the image is white.

[A2] The image processing apparatus according to [A1], further including
a determination unit that determines whether the background is white on the basis of a brightness value of a peripheral area of the image, in which
the third extraction unit uses a result of determination by the determination unit.

[A3] The image processing apparatus according to [A2], in which
the determination unit determines whether the background of the image is white by using a result of determination as to whether four peripheral areas are each a white area.

[A4] The image processing apparatus according to [A2], in which
in a case where the determination unit determines that the background of the image is not white, the third extraction unit extracts the areas of the document images by using both the first area and the second area.

[A5] The image processing apparatus according to [A4], in which
in a case where the determination unit determines that the background of the image is white, the third extraction unit extracts the areas of the document images by preferentially using the second area.

[A6] The image processing apparatus according to any one of [A1] to [A5], in which
the first extraction unit extracts the first area by performing a binarization process.

[A7] The image processing apparatus according to any one of [A1] to [A6], in which
the second extraction unit extracts the second area by performing an edge detection process or a color difference detection process.

[A8] The image processing apparatus according to [A2] or any one of [A3] to [A7] directly or indirectly citing [A2], further including
a display that performs display to prompt a user to specify whether the background is white or a color other than white or performs display to prompt the user to provide an instruction for a re-scan in a case where the determination unit fails to determine whether the background is white.

[A9] A non-transitory computer readable medium storing a program causing a computer to execute a process for image processing, the process including:
extracting a first area in an image that includes plural document images, the first area having low-frequency characteristics;
extracting a second area in the image, the second area having high-frequency characteristics; and
extracting areas of the document images by combining the first area and the second area in accordance with whether a background of the image is white.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
at least one hardware processor configured to implement:
a receiving unit that receives an image including a plurality of document images;
a first detection unit that detects an outermost rectangular shape in the image including the plurality of document images;
a second detection unit that, in a case where a background of the outermost rectangular shape is not white, detects rectangular shapes included in the outermost rectangular shape detected by the first detection unit as document images; and
an output unit that outputs at least one of the document images.

2. The image processing apparatus according to claim 1, wherein
in a case where the background of the outermost rectangular shape is white, the second detection unit detects the outermost rectangular shape detected by the first detection unit as a document image.

3. The image processing apparatus according to claim 1, wherein the at least one hardware processor is further configured to implement:
a determination unit that determines whether the background of the outermost rectangular shape detected by the first detection unit is white in accordance with a predetermined condition, wherein the second detection unit uses a result of determination by the determination unit.

4. The image processing apparatus according to claim 3, wherein as the condition, a comparison between a number of rectangular shapes detected by the first detection unit and a predetermined threshold is used.

5. The image processing apparatus according to claim 3, wherein as the condition, a comparison between a number of black pixels or a number of white pixels in a predetermined area in the outermost rectangular shape detected by the first detection unit and a predetermined threshold is used.

6. The image processing apparatus according to claim 3, wherein as the condition, a comparison between a size of the outermost rectangular shape detected by the first detection unit and a predetermined threshold is used.

7. The image processing apparatus according to claim 3, wherein as the condition, a comparison between a number of rectangular shapes included in the outermost rectangular shape detected by the first detection unit and a predetermined threshold is used.

8. The image processing apparatus according to claim 1, wherein the second detection unit further detects the rectangular shapes from a reduced version of the image and restores coordinates of the rectangular shapes in the reduced version to corresponding coordinates in the image.

9. The image processing apparatus according to claim 8, wherein the second detection unit further generates the reduced version by reducing a first resolution of the image to a second resolution, and wherein the second resolution is lower than the first resolution.

10. The image processing apparatus according to claim 8, wherein the second detection unit further detects, from the reduced version, whether the background of the rectangular shape is non-white by determining whether portions outside of all of the rectangular shapes are non-white, and wherein the second detection unit further detects the rectangular shapes as respective portions, within the rectangular shape, as having white borders within a non-white background outside of the rectangular shapes.

11. The image processing apparatus according to claim 1, wherein the second detection unit further detects the rectangular shapes by determining differences between brightness components of pixels in the outermost rectangular shape.

12. The image processing apparatus according to claim 1, wherein the second detection unit further detects the rectangular shapes by determining differences between frequency characteristics of pixels in the outermost rectangular shape.

13. The image processing apparatus according to claim 1, wherein the at least one hardware processor is further configured to control a display of the image processing apparatus to display the document images of the rectangular shapes without the background.

14. A non-transitory computer readable medium storing a program causing a computer to execute a process for image processing, the process comprising:

receiving an image including a plurality of document images;

detecting an outermost rectangular shape in the image including the plurality of document images;

detecting, in a case where a background of the outermost rectangular shape is not white, rectangular shapes included in the detected outermost rectangular shape as document images; and outputting at least one of the document images.

* * * * *